United States Patent
Loveness et al.

(10) Patent No.: US 9,172,094 B2
(45) Date of Patent: Oct. 27, 2015

(54) TEMPLATE ELECTRODE STRUCTURES FOR DEPOSITING ACTIVE MATERIALS

(71) Applicant: Amprius, Inc., Sunnyvale, CA (US)

(72) Inventors: Ghyrn E. Loveness, Mountain View, CA (US); William S. DelHagen, San Francisco, CA (US); Rainer Fasching, Mill Valley, CA (US); Song Han, Foster City, CA (US); Zuqin Liu, Sunnyvale, CA (US)

(73) Assignee: Amprius, Inc., Sunnyvale, CA (US)

( * ) Notice: Subject to any disclaimer, the term of this patent is extended or adjusted under 35 U.S.C. 154(b) by 12 days.

(21) Appl. No.: 13/914,491

(22) Filed: Jun. 10, 2013

(65) Prior Publication Data

US 2013/0344383 A1 Dec. 26, 2013

Related U.S. Application Data

(60) Continuation of application No. 13/564,324, filed on Aug. 1, 2012, now Pat. No. 8,556,996, which is a
(Continued)

(51) Int. Cl.
*H01M 4/75* (2006.01)
*H01M 4/38* (2006.01)
(Continued)

(52) U.S. Cl.
CPC .............. *H01M 4/75* (2013.01); *H01M 4/0428* (2013.01); *H01M 4/134* (2013.01);
(Continued)

(58) Field of Classification Search
CPC ..... H01M 4/75; H01M 4/0428; H01M 4/134;
H01M 4/1395; H01M 4/366; H01M 4/38;
H01M 4/587; H01M 4/66; H01M 4/661;
H01M 4/667; H01M 10/0525
USPC ........... 429/211, 218.1, 223, 220, 219, 231.5, 429/229, 221; 252/182.1
See application file for complete search history.

(56) References Cited

U.S. PATENT DOCUMENTS

| 4,366,215 A | 12/1982 | Coetzer et al. |
| 4,436,796 A | 3/1984 | Huggins et al. |

(Continued)

FOREIGN PATENT DOCUMENTS

| CN | 1705148 | 12/2005 |
| CN | 101560694 | 10/2009 |

(Continued)

OTHER PUBLICATIONS

Chan, Candace K. et al., "Structural and electrochemical study of the reaction of lithium with silicon nanowires," Journal of Power Sources 189 (2009) 34-39.
(Continued)

*Primary Examiner* — Kenneth Douyette
(74) *Attorney, Agent, or Firm* — Weaver Austin Villeneuve & Sampson LLP

(57) ABSTRACT

Provided are examples of electrochemically active electrode materials, electrodes using such materials, and methods of manufacturing such electrodes. Electrochemically active electrode materials may include a high surface area template containing a metal silicide and a layer of high capacity active material deposited over the template. The template may serve as a mechanical support for the active material and/or an electrical conductor between the active material and, for example, a substrate. Due to the high surface area of the template, even a thin layer of the active material can provide sufficient active material loading and corresponding battery capacity. As such, a thickness of the layer may be maintained below the fracture threshold of the active material used and preserve its structural integrity during battery cycling.

28 Claims, 12 Drawing Sheets

Related U.S. Application Data division of application No. 13/039,031, filed on Mar. 2, 2011, now Pat. No. 8,257,866, which is a continuation-in-part of application No. 12/437,529, filed on May 7, 2009, now abandoned.

(60) Provisional application No. 61/310,183, filed on Mar. 3, 2010.

(51) Int. Cl.

| | |
|---|---|
| *H01M 4/36* | (2006.01) |
| *H01M 4/04* | (2006.01) |
| *H01M 4/134* | (2010.01) |
| *H01M 4/1395* | (2010.01) |
| *H01M 4/66* | (2006.01) |
| *H01M 4/587* | (2010.01) |
| *H01M 10/0525* | (2010.01) |

(52) U.S. Cl.
CPC ............ *H01M 4/1395* (2013.01); *H01M 4/366* (2013.01); *H01M 4/38* (2013.01); *H01M 4/66* (2013.01); *H01M 4/661* (2013.01); *H01M 4/667* (2013.01); *H01M 4/587* (2013.01); *H01M 10/0525* (2013.01); *Y02E 60/122* (2013.01); *Y10T 29/49108* (2015.01); *Y10T 29/49115* (2015.01)

(56) References Cited

U.S. PATENT DOCUMENTS

| | | | |
|---|---|---|---|
| 5,457,343 A | 10/1995 | Ajayan | |
| 5,997,832 A | 12/1999 | Lieber | |
| 6,083,644 A | 7/2000 | Watanabe et al. | |
| 6,090,505 A | 7/2000 | Shimamura et al. | |
| 6,334,939 B1 | 1/2002 | Zhou | |
| 6,423,453 B1 | 7/2002 | Noda | |
| 6,514,395 B2 | 2/2003 | Zhou | |
| 7,402,829 B2 | 7/2008 | Green | |
| 7,408,829 B2 | 8/2008 | Kuang et al. | |
| 7,816,031 B2 | 10/2010 | Cui et al. | |
| 8,257,866 B2 | 9/2012 | Loveness et al. | |
| 8,491,718 B2 † | 7/2013 | Chaudhari | |
| 8,556,996 B2 | 10/2013 | Loveness et al. | |
| 8,877,374 B2 | 11/2014 | Cui et al. | |
| 2002/0028384 A1 | 3/2002 | Krasnov et al. | |
| 2002/0102461 A1 | 8/2002 | Baker et al. | |
| 2002/0148727 A1 | 10/2002 | Zhou et al. | |
| 2003/0175589 A1 | 9/2003 | Kaminaka et al. | |
| 2003/0178104 A1 | 9/2003 | Sekine | |
| 2003/0203139 A1 | 10/2003 | Ren et al. | |
| 2004/0126659 A1 | 7/2004 | Graetz | |
| 2005/0153208 A1 | 7/2005 | Konishiike et al. | |
| 2005/0175901 A1 | 8/2005 | Kawakami et al. | |
| 2005/0238810 A1 | 10/2005 | Scaringe et al. | |
| 2005/0279274 A1 | 12/2005 | Nui et al. | |
| 2006/0040182 A1 | 2/2006 | Kawakami et al. | |
| 2006/0097691 A1 | 5/2006 | Green | |
| 2006/0154141 A1 | 7/2006 | Salot et al. | |
| 2006/0165988 A1 | 7/2006 | Chinag et al. | |
| 2006/0216603 A1 | 9/2006 | Choi | |
| 2007/0065720 A1 | 3/2007 | Hasegawa et al. | |
| 2007/0095276 A1 | 5/2007 | Sunkara et al. | |
| 2007/0148544 A1 | 6/2007 | Le | |
| 2007/0154808 A1 | 7/2007 | Konishiike et al. | |
| 2008/0808844 | 1/2008 | Bettge et al. | |
| 2008/0044732 A1 | 2/2008 | Salot et al. | |
| 2008/0145762 A1 | 6/2008 | Adachi et al. | |
| 2008/0213603 A1 | 9/2008 | Kobayashi et al. | |
| 2008/0274403 A1 | 11/2008 | Kim et al. | |
| 2008/0280169 A1 | 11/2008 | Niu et al. | |
| 2008/0280207 A1 | 11/2008 | Patoux et al. | |
| 2009/0042102 A1 | 2/2009 | Cui et al. | |
| 2009/0061319 A1 | 3/2009 | Kim et al. | |
| 2009/0068553 A1 | 3/2009 | Firsich et al/ | |
| 2009/0169996 A1 | 7/2009 | Zhamu et al. | |
| 2009/0176159 A1 | 7/2009 | Zhamu et al. | |
| 2009/0214944 A1 | 8/2009 | Rojeski | |
| 2009/0246628 A1 | 10/2009 | Adachi et al. | |
| 2009/0269511 A1 | 10/2009 | Zhamu et al. | |
| 2009/0291371 A1 | 11/2009 | Konishiike et al. | |
| 2009/0305131 A1 | 12/2009 | Kumar et al. | |
| 2009/0316335 A1 | 12/2009 | Simon et al. | |
| 2010/0043877 A1 | 2/2010 | Wang et al. | |
| 2010/0122725 A1 | 5/2010 | Buchine et al. | |
| 2010/0159337 A1 | 6/2010 | Matsumoto et al. | |
| 2010/0209775 A1 | 8/2010 | Kim et al. | |
| 2010/0237272 A1 † | 9/2010 | Chaudhari | |
| 2010/0285358 A1 | 11/2010 | Cui et al. | |
| 2010/0310941 A1 | 12/2010 | Kumta et al. | |
| 2010/0330421 A1 | 12/2010 | Cui et al. | |
| 2010/0330423 A1 | 12/2010 | Cui et al. | |
| 2011/0111294 A1 | 5/2011 | Lopez et al. | |
| 2011/0111304 A1 | 5/2011 | Cui et al. | |
| 2011/0143019 A1 | 6/2011 | Mosso et al. | |
| 2011/0143263 A1 | 6/2011 | Shirvanian | |
| 2011/0159365 A1 | 6/2011 | Loveness et al. | |
| 2011/0159367 A1 | 6/2011 | Kim et al. | |
| 2011/0189510 A1 | 8/2011 | Caracciolo et al. | |
| 2011/0287318 A1 | 11/2011 | Loveness et al. | |
| 2012/0070741 A1 | 3/2012 | Liu et al. | |
| 2012/0183856 A1 | 7/2012 | Cui et al. | |
| 2012/0301785 A1 | 11/2012 | Buchine et al. | |
| 2012/0301789 A1 | 11/2012 | Loveness et al. | |
| 2013/0011736 A1 | 1/2013 | Loveness et al. | |
| 2013/0344383 A1 | 12/2013 | Loveness et al. | |

FOREIGN PATENT DOCUMENTS

| | | |
|---|---|---|
| CN | 101953014 | 1/2011 |
| CN | 102460782 | 5/2012 |
| EP | 845828 | 10/2002 |
| EP | 1494302 | 1/2005 |
| FR | 2880198 | 6/2006 |
| GB | 2470056 | 11/2010 |
| JP | 2007-061945 | 3/2007 |
| JP | 2008-026595 | 2/2008 |
| JP | 2008-192594 | 8/2008 |
| JP | 2008-269827 | 11/2008 |
| JP | 2008-305781 | 12/2008 |
| JP | 2009-021226 | 1/2009 |
| WO | 2006/123049 | 11/2006 |
| WO | 2007/083152 | 1/2007 |
| WO | 2007/071778 | 6/2007 |
| WO | 2007/083155 | 7/2007 |
| WO | 2008/139157 | 11/2008 |
| WO | 2009/010757 | 1/2009 |
| WO | 2009/010758 | 1/2009 |
| WO | 2009/010759 | 1/2009 |
| WO | 2009/129490 | 10/2009 |
| WO | 2010/100599 | 9/2010 |
| WO | 2010/129910 | 11/2010 |
| WO | 2010/138617 | 12/2010 |
| WO | 2010/138619 | 12/2010 |
| WO | 2011/015174 | 2/2011 |
| WO | 2011/056847 | 5/2011 |
| WO | 2011/066818 | 6/2011 |
| WO | 2011/094642 | 8/2011 |
| WO | 2011/109477 | 9/2011 |
| WO | 2011/149958 | 12/2011 |
| WO | 2012/027360 | 3/2012 |
| WO | 2012/054767 | 4/2012 |

OTHER PUBLICATIONS

U.S. Appl. No. 13/277,821, Office Action mailed Oct. 11, 2013.
Chaudhari, P. et al. "Heteroepitaxial silicon film growth at 600 degree C for an Al-Si eutectic melt," Thin Solid Films 518 (2010) 5368-5371.
U.S. Appl. No. 13/427,681, Office Action mailed Oct. 2, 2013.
EP patent application No. 08831531.2, Supplemental European Search Report mailed Jul. 4, 2013.

(56) References Cited

OTHER PUBLICATIONS

JP patent application No. 2012-510025, Notice of Reasons for Rejection mailed Jan. 7, 2014.
Pre-Issuance Submission by Third Party dated Jan. 15, 2014, received in U.S. Appl. No. 13/914,491.
Pre-Issuance Submission by Third Party dated Jan. 21, 2014, received in U.S. Appl. No. 13/540,484.
Aifantis et al., "High energy density lithium batteries", 2010 WILEY-VCH Verlag GmbH & Co. KGaA, Weinheim (Chapter 6: Next-generation anodes for secondary Li-Ion batteries) ISBN 978-3-527-32407-1.
Kasavajjula et al., "Nano- and bulk-silicon-based insertion anodes for lithium-ion secondary cells", Journal of Power Sources 163 (2007) 1003-1039.
U.S. Appl. No. 12/437,529, Office Action mailed May 13, 2011.
U.S. Appl. No. 12/437,529, Office Action mailed Oct. 20, 2011.
U.S. Appl. No. 12/437,529, Office Action mailed Dec. 22, 2011.
Cui, Yi et al., "Doping and electrical transport in silicon nanowires", The Journal of Physical Chemistry, vol. 104, No. 22, Jun. 8, 2000.
U.S. Appl. No. 13/277,821, "High capacity battery electrode structures," Liu et al., filed Oct. 20, 2011.
WO patent application No. PCT/US2010/036235, International Search Report and Written Opinion mailed Jan. 28, 2001.
WO patent application No. PCT/US2011/026816, International Search Report and Written Opinion mailed Oct. 18, 2011.
WO patent application No. PCT/US2010/036237, International Search Report mailed May 26, 2010.
WO patent application No. PCT/US2010/036237, Written Opinion mailed May 27, 2011.
Cui, Li-Feng et al., "Crystallline-amorphous core-shell silicon nanowires for high capacity and high current battery electrodes," Nano Letters, 2009, vol. 9, No. 1 491-495, Dec. 23, 2008.
Kim, Cheol-Joo et al., "Spontaneous chemical vapor growth of NiSi nanowires and their metallic properties," Advanced Materials, 2007, 19, 3637-3642, Oct. 16, 2007.
Chan, Candace K. et al., "Surface chemistry and morphology of the solid electrolyte interphase on silicon nanowire lithium-ion battery anodes," Journal of Power Sources 189 (2009) 1132-1140.
Cui, Li-Feng et al., "Carbon-silicon core-shell nanowires as high capacity electrode for lithium ion batteries," Nano Letters, published on Aug. 5, 2009 on http://pubs.acs.org.
Esmanski, Alexei et al., "Silicon inverse-opal-based macroporous materials as negative electrodes for lithium ion batteries," Advanced Functional Materials, 2009, 1999-2010, May 7, 2009.
Park, Mi-Hee et al., "Silicon nanotube battery anodes," Nano Letters 2009, vol. 9, No. 11 3844 3847, Sep. 11, 2009.
Park, Mi-Hee et al., "Supporting information for silicon nanotube battery anodes," Sep. 11, 2009.
Kim, Hyunjung et al., "Three-dimensional porous silicon particles for use in high-performance lithium secondary batteries," Angewandte Chemie, Int. Ed. 2008, 47, 10151-10154, Nov. 17, 2008.
For high-performance anode material in lithium-ion batteries, After Gutenberg, downloaded from http://jcwinnie.biz/wordpress/?p=2864 on Dec. 25, 2009.
Magasinki, A. et al., "High-performance lithium-ion anodes using a hierarchical bottom-up approach," Nature Materials, published online at www.nature.com/naturematerials Mar. 14, 2010.
Kang, Kubum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., Unconventional roles of metal catalysts in chemical-vapor syntheses of singel-crystalline nanowires,: Journal of Applied Physics 105, 122407 (2009).
Zhang, Hong-Li et al., "The facile synthesis of nickel silicide nanobelts and nanosheets and their application in electrochemical energy storage," Nanotechnology 19 (2008) 165606, (7 pp), Mar. 20, 2008.
Chan et al., "High-performance lithium battery anodes using silicon nanowires," Nature Nanotechnology, vol. 3, Jan. 2008.

WO patent application No. PCT/US2010/034106, International Search Report and Written Opinion mailed Feb. 7, 2011.
U.S. Appl. No. 11/837,291, Office Action mailed Feb. 18, 2009.
U.S. Appl. No. 11/837,291, Office Action mailed Oct. 26, 2009.
U.S. Appl. No. 11/837,291, Office Action mailed Jan. 7, 2010.
U.S. Appl. No. 11/837,291, Office Action mailed Apr. 22, 2010.
U.S. Appl. No. 11/837,291, Notice of Allowance mailed Aug. 10, 2010.
U.S. Appl. No. 12/895,424, Office Action mailed Nov. 17, 2010.
Ying et al., "Characterization of SnO2 nanowires as anode materials for Li-ion batteries." Applied Physics Letters 87(11), 2005 (Abstract only).
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Yazawa et al., "Effect of one monolayer of surface gold atoms on the epitaxial growth of InAs nanowhiskers," Appl. Phys. Lett. 61 (17), 2051-2053 (Oct. 1992).
EP patent application No. 08831531.2, European Search Report mailed Oct. 27, 2010.
Li et al., "Freestanding mesoporous quasi-single-crystalline Co3O4 nanowire arrays," J. Am. Chem. Soc. 2006, 128, 14258-14259, Oct. 18, 2006.
Sharma et al., "Diameter control of Ti-catalyzed silicon nanowires," Journal of Crystal Growth 267 (2004) 613-618, Apr. 20, 2004.
Pan et al., Nanobelts of Semiconduction Oxides, Science Mar. 9, 2001: 1947-1949.
Huang et al., Catalytic Growth of Zinc Oxide Nanowires by Vapor Transport, Adv. Mater., 13, 113-116 (2001).
Morales, et al., A Laser Ablation Method for the Synthesis of Crystalline Semiconductor Nanowires, Science vol. 279, Jan. 9, 1998.
Dick, et al A New Understanding of Au-Assisted Growth of Ill-V Semiconductor Nanowires, Adv. Funct. Mater. 15, 1603-1610 (2005).
Chan, C.K., et al., High-Performance Lithium Battery Anodes Using Silicon Nanowires, Nature, vol. 3, Jan. 2008.
Chan, C.K., et al., "High Capacity Li Ion Battery Anodes Using Ge Nanowires", Nano Letters, 2008, vol. 8, No. 1, 307-309.
Che, G., et al., "Carbon Nanotubule Membranes for Electrochemical Energy Storage and Production". Nature 393, 346-349 (1998).
Park, M.S. et al., "Preparation and Electrochemical Properties of SnO2 Nanowires for Application in Lithium-ion Batteries" Angew. Chem. Int. Edn 46, 750-753 (2007).
Huggins, R.A. & Nix, W.D. Decrepitation Model for Capacity Loss During Cycling of Alloys in Rechargeable Electrochemical Systems, Ionics 6, 57-63 (2000).
Lee, Y.M., et al. SEI layer formation on amorphous Si thin electrode during precycling. J. Electrochem. Soc. 154, A515-A519 (2007).
Green, M., et al Structured silicon anodes for lithium battery applications. Electrochem. Solid State Lett. 6, A75-A79 (2003).
Ryu, J.H., et al Failure modes of silicon powder negative electrode in lithium secondary batteries. Electrochem. Solid-State Lett. 7, A306-A309 (2004).

(56) References Cited

OTHER PUBLICATIONS

Gao, et al., "Alloy formation in nanostructured silicon." Adv. Mater. 13, 816-819 (2001).
Wang, Y., et al. Epitaxial growth of silicon nanowires using an aluminum catalyst. Nature Naotech. 1, 186-189 (2006).
Wu, Y. et al. Controlled growth and structures of molecular-scale silicon nanowires. Nao Lett. 4, 433-436 (2004).
Zhou, Controlled Li Doping of Si Nanowires (Applied Physics Letters vol. 75, No. 16), Oct. 18, 1999.
Carbon nanofiber product sheet, Applied Science 2008, downloaded from http://www.apsci.com/ngm-pyrol.html on May 2011.
U.S. Appl. No. 13/427,681, "Electrode including nanostructures for rechargeable cells," Cui et al., filed Mar. 22, 2012.
WO patent application No. PCT/US2011/037767, International Search Report and Written Opinion mailed Jan. 16, 2012.
WO patent application No. PCT/US2011/057159, International Search Report and Written Opinion mailed Jun. 11, 2012.
Zhang, et al., "Pyrolytic Carbon-coated Silicon/Carbon Nanotube Composites: Promising Application for Li-ion Batteries," *Int. J. Nanomanufacturing*, vol. 2, Nos. 1/2, 2008, pp. 4-15.
Office Action mailed Apr. 5, 2012 for U.S. Appl. No. 13/039,031.
Notice of allowance mailed Jul. 26, 2012 for U.S. Appl. No. 13/039,031.
"Sweet nanotech batteries: Nanotechnology could solve lithium battery charging problems," PhysOrg.com, Received online Mar. 23, 2012 from http://phys.org/news127043619.html.
Lee et al., "Anomalous growth and characterization of carbon-coated nickel silicide nanowires," Chemical Physics Letters 384, 2004, pp. 215-218.
U.S. Appl. No. 13/564,324, titled Template Electrode Structures for Depositing Action Materials, filed Aug. 1, 2012.
U.S. Appl. No. 13/540,484, "Template Electrode Structures with Enhanced Adhesion Characteristics," Liu et al., filed Jul. 2, 2012.
US Office Action mailed Sep. 17, 2012 issued in U.S. Appl. No. 13/540,484.
Quasi-2D Structures Make Better Batteries, Tyrell, James, Apr. 17, 2008, pp. 1-2.
Nickel Silicide Nanobelts and Sheets in Li-ion Anodes Capacity, Green Car Congress, Apr. 19, 2009, pp. 1-3.
US Office Action mailed Oct. 25, 2012 issued in U.S. Appl. No. 13/427,681.
Marczak et al., "The individual core/shell silicon nanowire structure probed by Raman spetroscopy," Raman Spetroscopy, Phys. Status Solidi C 6 No. 9, 2053-2055, 2009.
Campbell et al., "Prepartion of mesoporous silica templated metal nanowire films on foamed nickel substrates," Microporous and Mesoporous Materials 97, 2006, 114-121.

TW patent publication No. 201238125, published Sep. 16, 2012, English Abstract.
U.S. Appl. No. 13/540,484, Notice of Allowance mailed Feb. 22, 2013.
U.S. Appl. No. 13/277,821, Office Action mailed Feb. 25, 2013.
U.S. Appl. No. 13/427,681, Office Action mailed Jun. 11, 2013.
Marczak et al., "The individual core/shell silicon nanowire structure probed by Raman spectroscopy," Phys. Status Solidi C 6, No. 9, 2053-2055 (2009).
WO patent application No. PCT/US2012/045313, International Search Report and Written Opinion mailed Jan. 21, 2013.
U.S. Appl. No. 13/427,681, Office Action mailed May 21, 2014.
U.S. Appl. No. 13/277,821, Office Action mailed Apr. 10, 2014.
U.S. Appl. No. 13/114,413, Office Action mailed Jun. 19, 2014.
JP patent application No. 2012-556203, Office Action mailed Aug. 26, 2014.
CN patent application No. 201180019460.3, Office Action mailed Jul. 2, 2014.
JP patent application No. 2012-510025, Decision of Rejection mailed Aug. 5, 2014.
CN patent application No. 201080026302.6, Office Action mailed Aug. 8, 2014.
U.S. Appl. No. 13/277,821, Final Office Action mailed Nov. 20, 2014.
CN patent application No. 201080026302.6, Office Action mailed Oct. 23, 2013.
U.S. Appl. No. 13/427,681, Office Action mailed Feb. 6, 2015.
U.S. Appl. No. 13/114,413, Notice to Allowance mailed Jan. 22, 2015.
EP Search Report issued in Application No. 12807729.4 on Feb. 5, 2015.
CN patent application No. 201080026302.6, Office Action mailed Mar. 23, 2015.
TW patent application No. 100120247, Office Action mailed Feb. 9, 2015.
CN patent application No. 201180019460.3, Office Action mailed May 6, 2015.
IL patent application No. 216248, Office Action mailed May 4, 2015.
U.S. Appl. No. 14/710,103, "Structurally Controlled Deposition of Silicon Onto Nanowires," filed May 12, 2015, Weijie Wang, et al.
JP patent application No. 2012-556203, Office Action mailed Jul. 14, 2015.
P. Chaudhari et al., Heteroepitaxial Silicon Film Growth at 600 C from an Al-Si Eutectic Melt, pp. 5368-5371, Mar. 19, 2010, Thin Solid Films, Elsevier, USA.†

† cited by third party

TEMPLATE ELECTRODE STRUCTURES FOR DEPOSITING ACTIVE MATERIALS

CROSS-REFERENCE TO RELATED APPLICATIONS

This application is a continuation of U.S. patent application Ser. No. 13/564,324, entitled "TEMPLATE ELECTRODE STRUCTURES FOR DEPOSITING ACTIVE MATERIALS," filed Aug. 1, 2012, now U.S. Pat. No. 8,556,996, which is a divisional of U.S. patent application Ser. No. 13/039,031, entitled "TEMPLATE ELECTRODE STRUCTURES FOR DEPOSITING ACTIVE MATERIALS," filed Mar. 2, 2011, now U.S. Pat. No. 8,257,866, which claims the benefit of priority to U.S. Provisional Application No. 61/310,183, filed Mar. 3, 2010, entitled "ELECTROCHEMICALLY ACTIVE STRUCTURES CONTAINING SILICIDES," and which is also a continuation-in-part of U.S patent application Ser. No. 12/437,529, entitled "ELECTRODE INCLUDING NANOSTRUCTURES FOR RECHARGEABLE CELLS" filed on May 7, 2009, now abandoned, all of which are incorporated herein by this reference for all purposes.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

BACKGROUND

The demand for high capacity rechargeable batteries is strong and growing stronger each year. Many applications, such as aerospace, medical devices, portable electronics, and automotive applications, require high gravimetric and/or volumetric capacity cells. Lithium ion electrode technology provided some improvements in this area. However, to date, lithium ion cells are mainly fabricated with graphite, which has a theoretical capacity of only 372 mAh/g.

Silicon, germanium, tin, and many other materials are attractive active materials because of their high electrochemical capacity. For example, silicon has a theoretical capacity of about 4200 mAh/g, which corresponds to the $Li_{4.4}Si$ phase. Yet, many of these materials are not widely used in commercial lithium ion batteries. One reason is that some of these materials exhibit substantial changes in volume during cycling. For example, silicon swells by as much as 400% when charged to its theoretical capacity. Volume changes of this magnitude can cause substantial stresses in the active material structures, resulting in fractures and pulverization, loss of electrical and mechanical connections within the electrode, and capacity fading.

Conventional electrodes include polymer binders that are used to hold active materials on the substrate. Most polymer binders are not sufficiently elastic to accommodate the large swelling of some high capacity materials. As a result, active material particles tend to separate from each other and the current collector. Overall, there is a need for improved applications of high capacity active materials in battery electrodes that minimize the drawbacks described above.

SUMMARY

Provided are examples of electrochemically active electrode materials, electrodes using such materials, and methods of manufacturing such electrodes. Electrochemically active electrode materials may include a high surface area template containing a metal silicide and a layer of high capacity active material deposited over the template. The template may serve as a mechanical support for the active material and/or an electrical conductor between the active material and, for example, a substrate. Due to the high surface area of the template, even a thin layer of the active material can provide sufficient active material loading and corresponding electrode capacity per surface area. As such, the thickness of the active material layer may be maintained below its fracture threshold to preserve its structural integrity during battery cycling. The thickness and/or composition of the active layer may also be specifically profiled to reduce swelling near the substrate interface and preserve this interface connection.

In certain embodiments, an electrochemically active electrode material for use in a lithium ion cell includes a nanostructured template containing a metal silicide and a layer of an electrochemically active material that coats the nanostructured template. The electrochemically active material is configured to take in and release lithium ions during cycling of the lithium ion cell. Further, the nanostructured template may facilitate the conduction of electrical current to and from the electrochemically active material. An electrochemically active electrode material may also include a shell formed over the layer of the electrochemically active material. The shell may include carbon, copper, a polymer, a sulfide, and/or a metal oxide.

Examples of a metal silicide in the nanostructured template include nickel silicide, cobalt silicide, copper silicide, silver silicide, chromium silicide, titanium silicide, aluminum silicide, zinc silicide, and iron silicide. In a specific embodiment, a metal silicide includes at least one different nickel silicide phase among $Ni_2Si$, $NiSi$, and $NiSi_2$. An electrochemically active material may be crystalline silicon, amorphous silicon, a silicon oxide, a silicon oxy-nitride, a tin containing material, a germanium containing material, and a carbon containing material. An electrochemically active material may have a theoretical lithiation capacity of at least about 500 mAh/g or, more specifically, of at least about 1000 mAh/g. Active materials with such capacities may be referred to as "high capacity active materials." In certain embodiments, an electrochemically active electrode material may be used for fabricating a positive electrode. Examples of positive electrochemically active materials include various active components in the form of $LiMO_2$, M representing one or more ions with an average oxidation state of three. Examples of these ions include vanadium (V), manganese (Mn), iron (Fe), cobalt (Co), and nickel (Ni). The inactive component may be in the form of $Li_2M'O_3$, M' representing one or more ions with an average oxidation state of four. Examples of these ions include manganese (Mn), titanium (Ti), zirconium (Zr), ruthenium (Ru), rhenium (Re), and platinum (Pt). Other positive active materials include sulfur, lithium iron silicates (Li2FeSiO4), hexavalent iron sodium oxides (Na2FeO4).

In certain embodiments, a layer of the electrochemically active material is doped to increase conductivity of the active materials. Some examples of dopants include phosphorous and/or boron. In certain embodiments, a nanostructured template includes silicide containing nanowires. The nanowires may be between about 1 micrometers and 200 micrometers in length on average and/or less than about 100 nanometers in diameter on average. A layer of the electrochemically active material is at least about 20 nanometers in thickness on average. In these or other embodiments, a mass ratio of the active material to the template is at least about 5.

In particular embodiments, a layer of the electrochemically active material includes amorphous silicon. This layer may be at least about 20 nanometers thick on average. Further, a nanostructured template includes nickel silicide nanowires that are between about 1 micrometers and 200 micrometers in length on average and less than about 100 nanometers in diameter on average.

Also provided is a lithium ion electrode for use in a lithium ion cell. In certain embodiments, a lithium ion cell electrode includes an electrochemically active electrode material containing a nanostructured template and a layer of an electrochemically active material coating the nanostructured template. The nanostructured template may include a metal silicide. The template may facilitate conduction of electrical current to and from the electrochemically active material. The electrochemically active material may be configured to take in and release lithium ions during cycling of the lithium ion cell. The electrode may also include a current collector substrate in electrical communication with the electrochemically active electrode material. The substrate may include a metal of the metal silicide.

In certain embodiments, a nanostructured template of the electrode includes nanowires rooted to the substrate. In some cases, the ratio of the surface area of the nanostructured template to the surface area of the substrate is at least about 20. The substrate may include a base sub-layer substantially free of the metal of the metal silicide and a top sub-layer containing the metal of the metal silicide. The substrate may include copper, nickel, titanium, and/or stainless steel. A substrate for positive electrodes may also include aluminum.

The electrochemically active electrode material may include multiple structures having free ends and substrate-rooted ends. Each of these multiple structures includes a nanostructured template and electrochemically active material. In certain embodiments, the electrochemically active material coats (at least partially) the templates. The active material layer may have a varying thickness and/or composition along the height of the template (e.g., along the length of a nanowire template). In a specific embodiment, the active material is at least twice as thick at the free ends of the structures than at the substrate-rooted ends. In the same or other embodiments, the electrochemically active material includes amorphous silicon and germanium. The material may have more silicon and less germanium at the free ends of the structures than at the substrate-rooted ends.

Also provided is a method of fabricating a lithium ion cell electrode for use in a lithium ion cell. In certain embodiments, a method includes receiving a substrate, forming a nanostructured template containing a metal silicide on a surface of the substrate, and forming a layer of an electrochemically active material on the nanostructured template. The electrochemically active material is configured to take in and release lithium ions during cycling of the lithium ion cell. The nanostructured template is configured to facilitate conduction of electrical current to and from the electrochemically active material. Furthermore, the template provides structural support to the electrochemically active material as further described below.

In certain embodiments, a method also includes treating the substrate prior to forming the metal silicide template. This treatment may involve one or more of the following techniques: oxidation, annealing, reduction, roughening, sputtering, etching, electroplating, reverse-electroplating, chemical vapor deposition, nitride formation, and depositing an intermediate sub-layer. A method may also include forming a metal component on the surface of the substrate such that a portion of the metal component is consumed when forming the metal silicide.

In certain embodiments, forming the nanostructured template includes flowing a silicon containing precursor over the surface of the substrate. A method may also include doping the electrochemically active materials. A method may also include forming a shell over the layer of the electrochemically active material. The shell may include one or more of the following materials: carbon, copper, a polymer, a sulfide, a fluoride, and a metal oxide.

In certain embodiments, the method also involves selectively depositing a passivation material over the nanostructured template prior to forming the layer of the electrochemically active material. The passivation material may include individual structures forming a layer and having discrete spacing in between these structures.

In certain embodiments, forming the layer of the electrochemically active material is performed in a mass transport regime such that a substantially lower concentration of an active material precursor is available at the surface of the substrate than at free ends of the nanostructured template. The method may also involve changing the composition of active material precursors while forming the layer of the electrochemically active material. This would allow production of, for example, the graded germanium/silicon nanostructures described above.

These and other features will be further described below with reference to the specific drawings.

DETAILED DESCRIPTION OF EXAMPLE EMBODIMENTS

Figure 1:
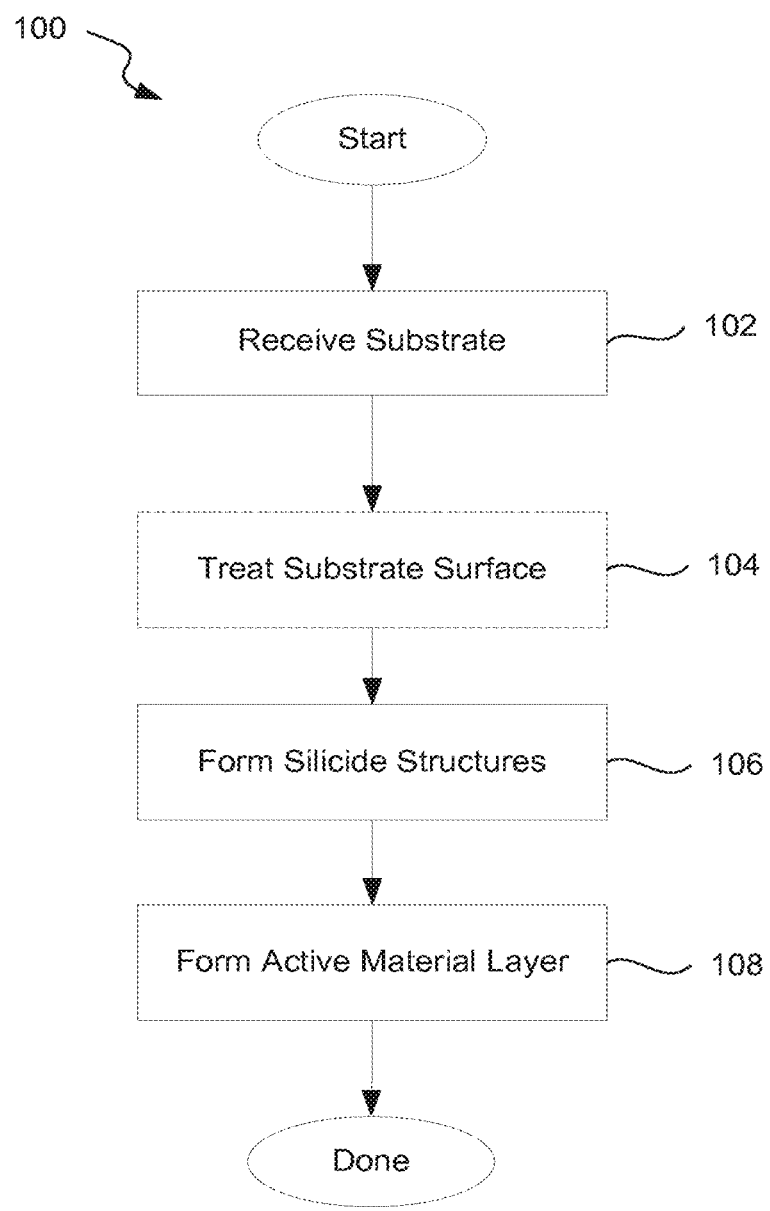
FIG. 1 illustrates a process example of fabricating an electrochemically active material containing a metal silicide template and a high capacity active material.

Nanostructures, and in particular nanowires, are exciting new materials for battery applications. It has been proposed that high capacity electrode active materials can be deployed as nanostructures and used without sacrificing battery performance. Even major swelling during lithiation, such as is observed with silicon, does not deteriorate the structural integrity of nanomaterials because of their small size. Stated another way, nanostructures possess a high surface area to volume ratio in comparison to conventional electrode morphologies. Additionally, the high surface area to volume ratio provides a greater fraction of the active material is directly accessible to electrochemically active ions from the electrolyte.

Various embodiments are described herein with reference to nanowires. It should be understood, however, that unless otherwise stated, the references herein to nanowires are intended to include other types of nanostructures including nanotubes, nanoparticles, nanospheres, nanorods, nanowhiskers, and the like. Generally, the term "nanostructures" refers to structures having at least one dimension that is less than about 1 micrometer. This dimension could be, for example, a diameter of the nanostructure (e.g., a silicide template nanowire), a thickness of the shell formed over a template (e.g., a thickness of the amorphous silicon layer), or some other nanostructure dimension. It should be understood that any of the overall dimensions (length and diameter) of the final coated structure do not have to be at a nanoscale. For example, a final structure may include a nano-layer that is about 500 nanometers in thickness and coated over a template that is about 100 nanometers in diameter and 20 micrometers in length. While this overall structure is about 1.1 micrometers in diameter and 20 micrometers in length, it could be generally referred to as a "nanostructure" because of the dimensions of the template and active material layer. In specific embodiments, the term "nanowire" refers to structures with nano-scaled shells positioned over elongated template structures.

Nanowires (as a specific case of nanostructures) have an aspect ratio of greater than one, typically at least about two and more frequently at least about four. In specific embodiments, nanowires have an aspect ratio of at least about 10 and even at least about 100. Nanowires may make use of their one larger dimension to connect to other electrode components (e.g., a conductive substrate, other active material structures, or conductive additives). For example, nanowires may be substrate rooted such that one end (or some other part) of the majority of the nanowires is in contact with the substrate. Because the two other dimensions are small and there is an adjacent void volume available for expansion, the internal stress built up in the nanowires during lithiation (e.g., expansion of the nano-shells positioned over the silicide templates) is also small and does not break apart the nanowires (as happens with larger structures). In other words, certain dimensions of the nanowires (e.g., an overall diameter and/or a shell thickness) are kept below the corresponding fracture levels of the active material used. Nanowires also permit a relatively high capacity per unit area of the electrode surface due to their elongated structure, which corresponds to the height of the template structure. This results from their relatively high aspect ratio and terminal connection to the substrate.

Depositing nanostructures containing high capacity materials may be a slow process that requires expensive materials, such as the gold catalyst used in a Vapor-Liquid-Solid (VLS) deposition process. Battery electrodes produced using such processes may be cost prohibitive for certain consumer applications, such as portable electronics and electrical vehicles. Furthermore, VLS deposition typically yields crystalline structures, which are more rigid than amorphous structures and, therefore, more susceptible to cracking and pulverization. Finally, a substrate connection of the VLS-deposited structures may be weak due to the distinct interface of two different materials (e.g., metallic substrate and high capacity active material), one of which undergoes substantial swelling while the other one remains intact. Without being restricted to any particular theory, it is believed that these phenomena could undermine the cycling performance of the batteries built from such electrodes.

It has been found that some metal silicide nanostructures can be formed directly on certain substrates without using catalysts. The silicide structures may be formed on surfaces that contain the metal making up the metal silicide. The metal containing substrate surfaces may be provided in various forms, such as a base sub-layer (e.g., a foil) or a separate sub-layer positioned over a base current collector (e.g., a thin nickel layer formed on a surface of a stainless steel or copper foil). In some examples, the metal containing surfaces are treated prior to the formation of silicide structures in order to promote the silicide formation process. For example, a surface having a nickel-containing surface may be oxidized prior to forming nickel silicide nanostructures. As further explained below, this oxidation creates nucleation points for nickel silicide formation. Overall, it has been found that oxidation allows a broader processing window during the template formation.

Silicide nanostructures can serve as a high surface area template that is later coated with high capacity active materials forming a "composite" electrode. For purposes of this document, a "template" generally includes a collection of nanostructures used for supporting active materials in the battery electrode. The template may provide both mechanical support and/or electrical communication to the active material with respect to, for example, a conductive substrate. In certain embodiments, the template is arranged as a layer adjacent to the substrate and may be characterized by its height or thickness. Such an arrangement may be referred to as a "template layer," which should be distinguished from other types of layers, such as an active material layer. This distinction is further pointed out in the description below. An adjacent substrate may be present in some but not all embodiments. In certain embodiments, a template coated with an active material may be directly connected to other conductive elements of the cell (other than a conductive substrate), such as electrical lead wires and battery terminals. In specific embodiments, a template may include a single layer of silicide nanowires extending generally away from the substrate, and in some embodiments in substantially the same direction. The height of this template will generally correspond to the average length of the nanowires. However, it should be understood that other silicide structural arrangements are also possible (e.g., multi-layered silicide templates).

A "template structure" generally refers to an individual structure that is a part of the template. Some template structures include silicide materials, while some structures in the same template may include other materials (e.g., conductive additives). Typically, template structures have at least one nano-scaled dimension (e.g., a diameter). Therefore, such template structures may be referred to as template nanostructures. In some embodiments, the template nanostructures may be shaped as nanowires with substrate rooted ends (or other portions) that form an integral structure with the substrate. In other words, they may not have a clearly defined morphological boundary or interface with the substrate surface to which the silicide nanowires are attached. As a result, substrate rooted nanowires may have superior mechanical adhesion to the substrate and low electrical contact resistance, for example, in comparison to the VLS-deposited structures Further, many silicides are good electrical conductors and can provide a highly conductive path between the active material deposited around the silicide nanowires and, for example, a current collecting substrate.

Metal silicides can also act as active materials themselves and be subjected to lithiation. However, silicides generally have far lower capacity than, for example, silicon or tin. Therefore, a silicide template may contribute comparatively less to the overall capacity of the electrode. This contribution may be particularly small when there is substantially more active material than there is silicide material. For example, silicide nanowires that are only about 10 nanometers in diameter may be used to deposit an active layer that is at least about 100 nanometers in thickness or, more specifically, between about 300 nanometers and 500 nanometers in thickness. In this example, a ratio of the active material volume to the silicide volume is at least about 400. Therefore, such composite electrodes may be used with substantially no lithiation of the silicide template. Minimal or substantially no lithiation of the silicide structures helps to preserve their integrity as a template and the integrity of their connections to the substrate. These characteristics lead to strong and robust mechanical and electrical connections within the electrode and, as a result, stable cycling performance over a large number of cycles. Various other features, such as cone-shaped silicide structures with thicker bases and cone-shaped (or mushroom-shaped) active material layers with thicker free-ends, may be used to help maintaining these connections. These features are typically focused on reducing swelling near the substrate interface using various techniques.

A silicide template containing nanowires has a large surface area available for supporting active materials. In certain embodiments, nanowires employed as the template are between about 10 nanometers and 100 nanometers in diameter and between about 10 micrometers and 100 micrometers in length. The nanowires may be densely spaced. Template structures that are closely spaced may share a common coating shell effectively forming a multi-core single shell arrangement. In such cases, the template growth density does not necessarily correspond to the density of the coated nanostructures. In certain embodiments, spacing between template structures may be even less than the coating thickness, thereby causing significant interconnections of the active material layer. These interconnections are particularly prominent near the bases creating agglomerated or continuous film like structures, which impede good cycle performance. Generally, it is desirable to avoid nanowires agglomerates, which are sometimes referred to as "bunches" or "bush-like" aggregates, further described with reference to FIG. 2B.

Often the template has a surface area that is orders of magnitude greater than that of a typical substrate. The template can be coated with a thin layer of the active material and, thereby, provide an electrode having a substantial reversible energy density. It should be noted that an active material layer does not necessarily require a continuous layer extending over the entire template and, in some embodiments, over the substrate. In some embodiments, an active material layer is a collection of active material shells positioned over silicide structures. Some of these shells may be disjoined at the substrate interface, for example, by providing passivation materials at the substrate interface. Various examples of the active material layer are described below. The thickness of the active material layer is generally determined by the characteristics of the active material used and generally kept below the fracture limit for the particular active material.

The thickness of the active layer coated over a template should be distinguished from the thickness of the battery electrode. The thickness of the active layer is generally nano-scaled, while the thickness of the battery electrode generally corresponds to at least the height of the template and could be tens of micrometers. It should be noted that template structures (e.g., silicide nanowires) are typically not perfectly vertical. Therefore, the template height may be somewhat less than the lengths of these structures. Generally, the conductive substrate also contributes to the thickness of the electrode. In one example, a 100 nanometer thick silicon layer deposited over 10 micrometer long nanowires that are 10 nanometers in diameter and spaced apart by 500 nanometers can provide an energy density comparable to that of a conventional graphite negative electrode that is substantially thicker. As such, electrochemical cells with improved gravimetric and volumetric capacity characteristics can be constructed using these active material structures and electrodes.

Once the template is formed, active materials can be deposited as a layer over this template in a relatively fast manner and without a need for expensive catalysts. Further, certain deposited active materials may take some more desirable morphological forms. For example, a catalyst-free deposition over nickel silicide nanowires yields amorphous silicon, while growing silicon nanowires from gold catalyst islands using VLS yields crystalline silicon. Without being restricted to any particular theory, it is believed that amorphous silicon structures have fewer and weaker atomic bonds, which allows such structures to retain their integrity better than the more rigid crystalline structures when exposed to the stress encountered during repeated lithiation/delithiation cycles. Also, deposition techniques used to form an active material layer may be specifically tuned to control distribution of the active material along the template height (e.g., depositing more active material near free-ends of the active material structures than near the bases) and to control other characteristics of the deposited materials, such as composition, porosity, and others.

Furthermore, various techniques have been proposed to protect the electrical connection between nanowires and conductive substrate. In one class of techniques, the structure of the completed nanowires has a "top heavy" shape in which a nanowire's attachment region, the region where the nanowire approaches and contacts the substrate, is relatively thinner than the distal region of the nanowire. Generally, the distal region will have substantially more active material than the attachment region. In another class of techniques, the spacing of the template nanowires is controlled such that the individual wires are relatively evenly spaced in their attachment to the substrate. In specific embodiments, a mechanism is employed to prevent the template nanowires from bunching near to one another at their attachment regions. In yet another class, certain "passivation" techniques and/or materials are employed to minimize mechanical distortions and stresses at the substrate interface that are generally caused by swelling and contraction of the active materials.

Figure 3A:
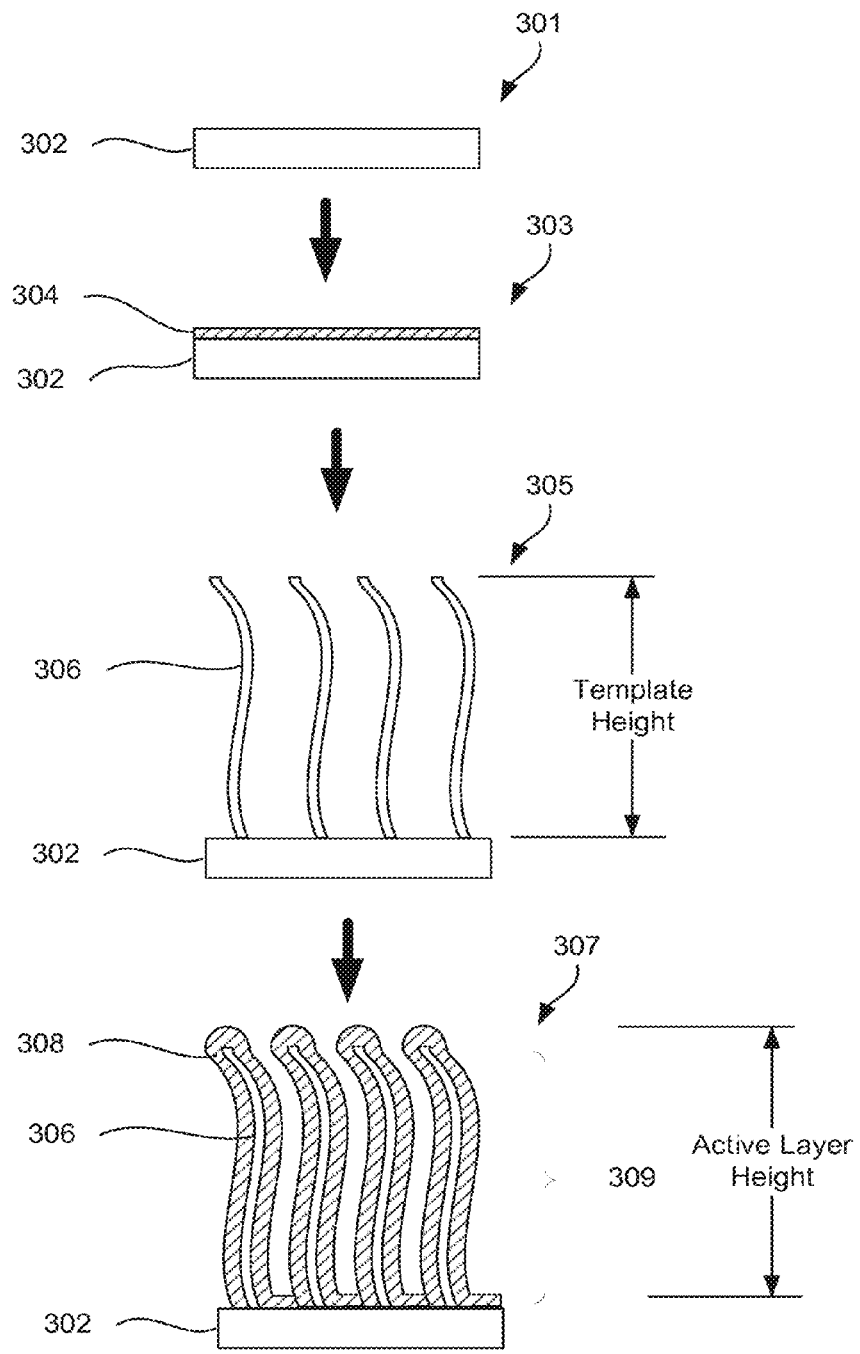
FIG. 3A illustrates an example of initial, intermediate, and final electrode structures that may be present at different stages of the fabrication process described in the context of FIG. 1.
Figure 3B:
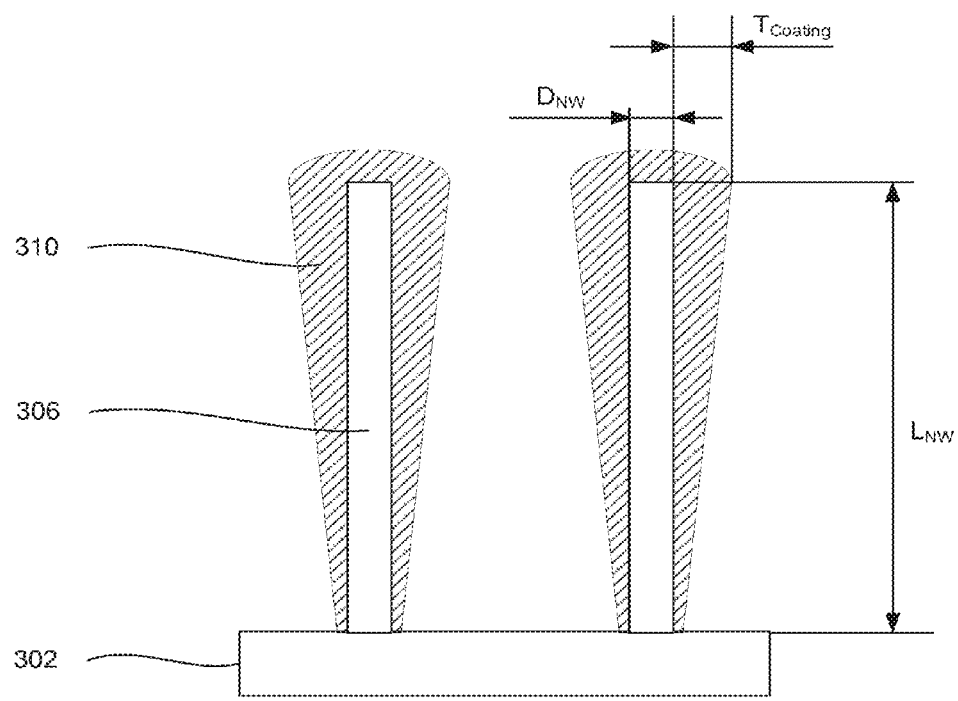
FIG. 3B illustrates an example of an electrode structure with uneven distribution of the high capacity active material.

Some examples of top heavy shapes include shapes that have gradually and continuously increased cross-sectional dimensions (e.g., diameter) from the substrate rooted ends to the free ends (similar to the ones shown in FIG. 3B). In other embodiments, the cross-sectional dimensions may increase gradually but not continuously. Other examples include shapes that increase their cross-sectional dimensions abruptly but continuously. Furthermore, other examples include shapes that increase their cross-sectional dimensions abruptly and not continuously. The overall shape profile may be driven by the thickness of the active material layer, cross-sectional dimensions of the template structures, or a combination of these two parameters. For example, a template structure may have a wider base than free end, while a distribution of the active material coating may be such that the overall electrode structure has a wider free end than the base.

FIG. 1 illustrates a process 100 of fabricating an electrochemically active electrode containing a metal silicide template and a high capacity active material, in accordance with certain embodiment. The process may start with receiving a substrate (operation 102). A substrate material may be provided as a roll, sheet, or any other form that is fed into a process apparatus used in one or more of subsequent operations. Typically, the substrate is made from a material that can serve as an electrode current collector, although this need not be the case (as explained below). Examples of suitable apparatus include Chemical Vapor Deposition (CVD) apparatus (e.g., Thermal CVD or a Plasma Enhanced CVD apparatus), Physical Vapor Deposition (PVD) apparatus, and other apparatus suitable for performing the operations described below. In certain embodiments, one or more operations of the described process are performed in a vertical deposition apparatus described in U.S. patent application Ser. No. 12/637,727 entitled "Apparatus for Deposition on Two Sides of the Web" filed on Dec. 14, 2009 to Mosso et al., which is incorporated by reference herein in its entirety for purposes of describing vertical deposition apparatuses.

The substrate is typically a part of the electrode (e.g., a current collector substrate). However, it may also be used as a temporary carrier that supports the template and active material during fabrication, and/or a source of materials during electrode fabrication (e.g., a source of metal in a metal silicide deposition operation), and then removed, while the template is electrically connected to the current collector components of the battery. If a substrate becomes a part of the electrode, it may generally include a material suitable for use in this electrode (from mechanical, electrical, and electrochemical perspectives). Examples include continuous foil sheets, perforated sheets, expanded metals, and foams.

In certain embodiments, the substrate includes a metal containing material, which metal is consumed to form metal silicide nanostructures. Examples of suitable metal containing materials are provided below. The metal containing material may be supported on a base substrate sub-layer, which serves as a mechanical support for the template and the active materials. Alternatively or in addition, the base substrate sub-layer may serve as an electrical current conductor between the silicide nanostructures (and, to a lesser extent, the active materials) and the battery electrical terminals.

Various intermediate sub-layers may be provided in between the base material and the metal source. For example, a sub-layer containing copper and/or nickel may be deposited between the base and metal source sub-layers to improve metallurgical and electronic connections of the later-formed template to the base sub-layer. In a specific embodiment, a base sub-layer containing a conductive material (e.g., stainless steel) is coated with a thin sub-layer of copper followed by a thicker sub-layer of nickel (e.g., between about 10 nanometers and 3 micrometers). The nickel sub-layer is then used to form a nickel silicide template, while the copper sub-layer acts as an adhesion and conductive intermediary.

In certain embodiments, the same material serves as both the current collecting base material and the metal source for the silicide template. Examples of materials that may be used as both a base material and a metal source for the silicide include nickel, copper, and titanium, both of which may be provided as foils, perforated sheets, expanded metals, foams, and the like. In other embodiments, the substrate contains two materials that form distinct sub-layers or other structures (e.g., a copper base foil coated with a thin nickel layer). In some cases, the metal source material exists as discrete droplets, particles, or regular patterns distributed throughout the base material. Typically, though not necessarily, the metal containing material used to form the silicide is positioned on the base material surface so that it is directly exposed to the processing environment (e.g., a silicon containing precursor gas) during processing. Generally, distribution of the two materials within the same structure may be uniform (an alloy or compound in the extreme case) or non-uniform (e.g., a gradual distribution with more metal source material concentrating near the surface).

Examples of base materials include copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of the above (including multi-layered structures). The base material may be formed as a foil, film, mesh, foam, laminate, wires, tubes, particles, multi-layered structure, or any other suitable configuration. In certain embodiments, a base material is a metallic foil with a thickness of between about 1 micrometer and 50 micrometers or, more specifically, between about 5 micrometers and 30 micrometers.

Examples of metal containing source materials include nickel, cobalt, copper, silver, chromium, titanium, iron, zinc, aluminum, tin and their combinations. Examples of some alloys include nickel/phosphorus, nickel/tungsten, nickel/chromium, nickel/cobalt, nickel/iron, nickel/titanium, and nickel/molybdenum. As mentioned, in certain embodiments, a metal containing source material forms a source sub-layer on the top of the base material. Such a source sub-layer may be at least about 10 nm thick or, more specifically, at least about 100 nm. In certain embodiments, a source sub-layer may be up to about 3 micrometers thick. In other embodiments, a metal containing material forms particles or some other discrete structures on the surface of the base material. These discrete structures may be provided in a thickness of at least about 10 nanometers thick or, more specifically, between about 10 nanometers and 50 micrometers. In general, a substrate should have a sufficient amount of the metal containing material near or on the substrate surface to form silicide nanostructures. For example, a 20-nanometer thick nickel sub-layer deposited over a copper base sub-layer may be sufficient to produce a dense mat of nickel silicide nanowires that are 20 micrometers long.

In certain embodiments, a thin sub-layer of a masking material is formed using a PVD or some other deposition technique. A thickness of this sub-layer may be between about 1 Angstroms and 15 Angstroms. It has been found that certain materials at such thicknesses do not form a continuous layer but instead form a collection of small separated islands or clumps. Specifically, masking materials may be deposited as small islands and used for masking the underlying substrate from depositing a metal containing sub-layer in these areas. Alternatively or in addition to, masking materials may be deposited on top of a metal containing sub-layer to mask template growth In certain embodiments, a metal containing sub-layer may be patterned during deposition of this sub-layer. For example, a masking sub-layer (e.g., a mesh) may be positioned over the base sub-layer and the metal containing sub-layer is formed over this combination. The covered portions of the base sub-layer will be substantially free from the metal and will not form silicide structures during later operations. A test was conducted using a metal mesh positioned over a substrate surface. Titanium was then deposited through the open spaces in the mesh, forming titanium islands. These islands in turn blocked silicide formation in these areas, which resulted in a patterned template growth. A special mesh with small pitch may be fabricated using, for example, nano-imprint lithography or some self assembled techniques to achieved desired distribution of the masking particles.

Figure 2A:
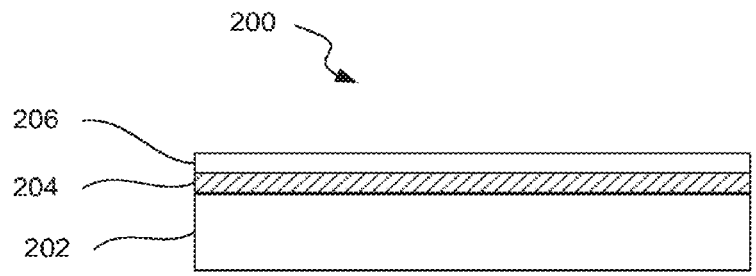
FIG. 2A is a schematic representation of a three-layered substrate example.

A substrate may contain other materials that may be used to enhance the adhesion of subsequently formed silicide nanostructures to the base sub-layer, to protect the base sub-layer during processing and cell cycling, to promote nucleation of the template structures, to prevent deposition of the active materials at (or near) the substrate interface, to act as an additional source of silicon during silicide formation, and other functions. For example, a substrate may include an intermediate sub-layer to perform such function. FIG. 2A is a schematic representation of a three-layered substrate 200, in accordance with certain embodiments. Sub-layer 202 is a base sub-layer, sub-layer 206 is a metal containing material sub-layer, and sub-layer 204 is an intermediate sub-layer. In certain embodiments (not shown), an intermediate sub-layer may be positioned on the other side of the metal containing sub-layer with respect to the base sub-layer (or the substrate). Additional examples and details of intermediate sub-layers are provided in U.S. Provisional Patent Application 61/260, 297 to DelHagen et al., entitled "INTERMEDIATE LAYERS FOR ELECTRODE FABRICATION" filed on Nov. 11, 2009, which is incorporated herein by reference in its entirety for purposes of describing intermediate sub-layers. Still other materials and sub-layer can be provided as a part of substrate. For example, a metal containing sub-layer may have a metal oxide sub-layer or a protective sub-layer.

Figure 2B:
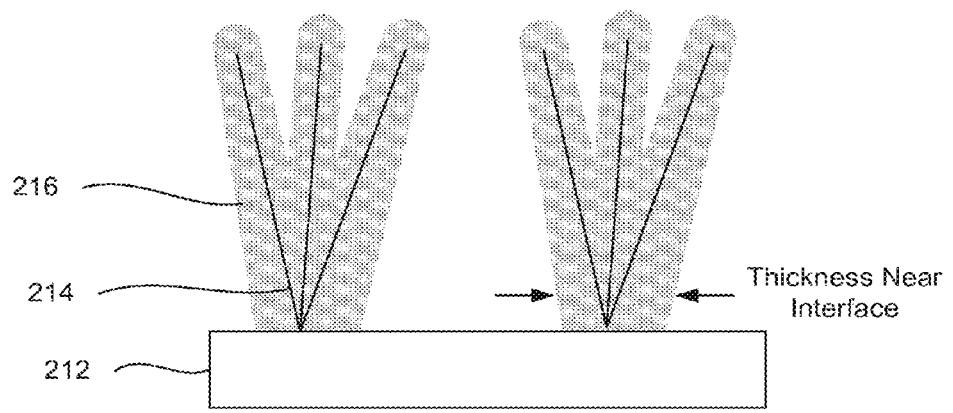
FIG. 2B is a schematic representation of clustered silicide structures coated with the active material layer that overlaps near the bases of the silicide structures, forming bulky active material agglomerates.

Returning to FIG. 1, a substrate received in operation 102 may have a masking sub-layer, which is positioned over the metal containing sub-layer. The masking sub-layer covers a portion of the metal containing sub-layer, while exposing certain small spaced-apart areas of the metal containing area. During formation of silicide structures in operation 106, the exposed areas are more available to react with silicon-containing precursors (e.g., silane), thereby resulting in the formation of discrete silicide structures such as the ones shown in FIG. 2C as opposed to the silicide structure clusters shown in FIG. 2B. Specifically, FIG. 2B is a schematic representation of clustered silicide structures 214 coated with the active material layer 216 that overlaps near the bases of the silicide structures (i.e., near the substrate 212) and forms bulky active material agglomerates. The overall dimension of these agglomerates (or the thickness of the active material near the substrate interface) may greatly exceed threshold limits for a particular active material, resulting in fractures and high stress near the interface during battery cycling. Not only may the active material delaminate from the silicide structures, but the entire silicide structure may separate from the substrate, thereby making them inoperative.

Figure 2C:
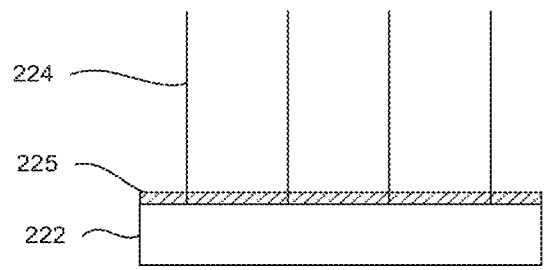
FIG. 2C is a schematic representation of separated silicide structures formed through a masking intermediate sub-layer, in accordance with certain embodiments.

Depositing a masking sub-layer may help to overcome such clustering. FIG. 2C is a schematic representation of separated silicide structures 224 formed through a masking intermediate sub-layer 225 positioned over the substrate 222, in accordance with certain embodiments. The masking intermediate sub-layer 225 may have openings that determine where the silicide structures 224 are formed, which allows for separating and distributing silicide structures 224 based on templates defined by the masking intermediate sub-layer 225. The distribution of the template structures could be random or patterned. Examples of the masking sub-layers include self-assembling zinc oxide particles and silicon oxide particles, and randomly oriented nanowires forming a mesh-structure over the metal containing sub-layer. Some corresponding techniques to form islands from a masking sub-layer or a metal containing sub-layer include evaporation, angle deposition, self-assembly, lithography patterning, and others.

Figure 2D:
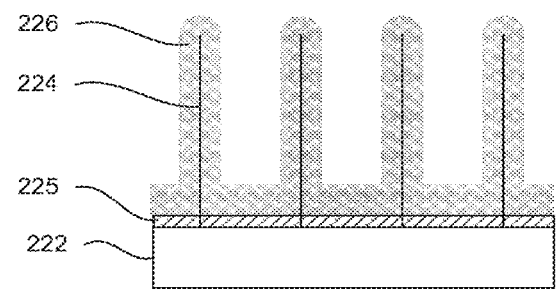
FIG. 2D is a schematic representation of the separated silicide structures coated with the active material layer that does not overlap near the bases of the silicide structures.

FIG. 2D is a schematic representation of the separated silicide structures 224 (similar to the ones depicted in FIG. 2C and described above) coated with an active material layer 226. The active material layer 226 does not overlap near the bases of the silicide structures 224 to form agglomerates. As such, even at the substrate interface, the active material layer 226 is within the fracture threshold, which results in less mechanical stress and pulverization than, for example, the structures deposited in FIG. 2B.

Masking sub-layers may remain as a part of the electrode or may be removed. The masking sub-layer used to pattern the metal containing sub-layer may be mechanically removed prior to formation of the silicide structures. The masking sub-layer used to cover portions of the metal containing sub-layer during formation of the silicide structures may be chemical removed (e.g., by selective etching of the masking sub-layer without substantially disturbing the silicide structures). Specific examples include acid etching, heating, and evaporating. In other embodiments, the masking sub-layer remains as a part of the electrode and may be used, for example, to prevent deposition of the active material at the substrate interface. Some of these examples are further described below with reference to FIGS. 2E and 2F.

It should be noted that substrate materials may interweave with each other (e.g., particles of the metal containing sub-layer positioned among particles of the intermediate sub-layer in a weave, felt, mesh, or comparable structure). Further, it should be noted that distinct materials may be provided together as a part of the substrate introduced to the process in operation 102, or one or more such materials may be deposited or otherwise integrated with the substrate in later processing operations.

Returning to FIG. 1, the process 100 may proceed with an optional treatment of the substrate surface (operation 104). The treatment may be used to modify the substrate surface in order to enhance silicide formation or for other purposes. Examples of such treatment include introducing materials used in metal silicide formation (e.g., sources of silicon, sources of the metal, catalysts, and the like), chemically modifying the substrate surface (e.g., forming oxides, nitrides, carbides, initial silicide structures, and treatments with various oxidizing and reducing agents), physically modifying the surface (e.g., increasing surface roughness by laser ablation, knurling, electro-polishing (such as electro-plating and reverse-electroplating to increase the surface roughness), changing grain orientation, annealing, treating with oxygen based plasma to form an oxide, treating with argon based plasma to change roughness (e.g., sputter cone formation), sonication, and ion implantation. It should be noted that some of these techniques may be used to control amounts of various materials (e.g., a metal source material) present on the surface as well as the physical characteristics of these materials (e.g., surface roughness). For example, chemically modifying the substrate surface with reducing or oxidizing agents can be used to modify the roughness at a scale particularly useful for facilitating nucleation. Sonication in acetone followed by methanol and isopropanol rinses may be used o clean metal foils prior to etching. Other techniques include oxygen plasma etching. Further, one may treat the surface with a dopant to increase the conductivity of the silicide structure if the dopant diffuses into the silicon reacting metal.

In certain embodiments, a substrate containing a nickel coating or other silicide source material on its surface is first oxidized. As mentioned above, a bulk of the substrate may be made from a silicide source material. A specific example includes nickel foil. When a nickel sub-layer is used on a top of another substrate, the thickness of the nickel coating may be between about 50 nanometers and 300 nanometers for the process conditions presented below. A temperature of the substrate during oxidation/treatment may be maintained at between about 150° C. and 500° C. for between about 0.1 and 10 minutes in the presence of oxygen or other suitable oxidant. In more specific embodiments, the oxidation is performed in the presence of air in a chamber maintained at about 50 Torr for about one minute, while the substrate is kept at about 300° C. The oxidation/treatment may proceed for between about 1-2 minutes. In certain embodiments, no specific oxidation/treatment operation is present, and the process proceeds directly with formation of template structures. It is believed that residual moisture and oxygen present in a deposition chamber provide sufficient treatment of the nickel surface during process initiation and deposition stages. However, in order to achieve a more controlled formation of silicide template, a specifically controlled oxidation operation may be needed. Specifically, it has been found that some oxidation helps formation of nickel silicide structures. Without being restricted to any particular theory, it is believed that during oxidation, a smooth nickel surface converts to a rougher nickel oxide surface. Rough oxide edges may serve as nucleation sites during later silicide formation. Further, the oxide may act as a mask to allow nucleation only at the pores of the nickel coating. This helps to achieve a more even distribution of silicide nanowires and avoids clustering (as described above).

Another function of an oxide may be to regulate the diffusion rate of the metal from the source material sub-layer and to the reaction site. It has been found that excessive oxidation may be detrimental to silicide formation. For example, when a flow of dry air of about 200 sccm is mixed with argon at about 1-5% and used for oxidation at 400° C. for about 30 seconds, a resulting surface is believed to be excessively oxidized. Instead of forming a rough surface with multiple nucleation sites, a resulting over-oxidized surface has a golden color and causes nucleation of very few silicide nanowires. In the same manner, an insufficiently oxidized surface may not provide sufficient nucleation sites. As such, oxidation conditions may be optimized for each metal containing material and the structures containing these materials.

The process 100 may proceed with the formation of silicide nanostructures (block 106). In certain embodiments, a substrate is introduced into a CVD chamber. It should be noted that other operations, such as treatment operation 104 and/or active material formation operation 108, may be performed in the same chamber. A silicon containing precursor, such as silane, is then flown into the chamber at a flow rate of, for example, between about 10 sccm and 300 sccm. These flow rate values are provided for the STS MESC Multiplex CVD system available from Surface Technology Systems in United Kingdom, which can process substrates up to about 4 inches in diameter. However, one having ordinary skills in the art would understand that other CVD systems may be used. The volumetric concentration of silane in the carrier gas may be less than about 10% or, more specifically, less than about 5%, or even less than about 1%. In particular embodiments, the concentration of silane is about 1%. A process gas may also include one or more carrier gases, such as argon, nitrogen, helium, hydrogen, oxygen (although typically not with silane), carbon dioxide, and methane. During silicide deposition, the substrate may be maintained at a temperature of between about 350° C. and 500° C. or, more specifically, between about 385° C. and 450° C. The chamber pressure may be between about 0.1 Torr and atmosphere pressure or, more specifically, between about 50 Torr and 300 Torr. The duration of deposition may be between about 1 minute and 60 minutes or, more specifically, between about 5 minutes and 15 minutes.

In certain embodiments, process conditions may be varied during the same deposition cycle. For example, silane may be introduced initially at a relatively high concentration in order to promote the nucleation of silicide nanostructures. The silane concentration may be then reduced (e.g., towards the end of the silicide deposition operation) when further nanowire growth is limited by metal diffusion from the rooted ends of the nanowires towards the growing tips. Further, the substrate temperature may initially be kept low and then increased in order to promote such metal diffusion. Overall, process conditions may be varied to control physical properties, e.g., length, diameter, shape, orientation of template structures. Furthermore, morphological properties of template structures, such as stoichiometric phases, crystalline/amorphous phases, and distribution of materials along the height of the template, may be controlled by varying process conditions. Other process conditions to be considered are a composition of the gas mixture, flow rates, flow patterns, a chamber pressure, a substrate temperature, and electric field characteristics. In certain embodiments, process conditions (e.g., temperature, pressure, and silane concentration) are adjusted to promote sidewall deposition of amorphous silicon or deposition of silicon particles onto the silicide structures once they have nucleated. Conditions that could be changed may include process temperature, pressure, and silane concentration.

The chosen process conditions generally depend on a metal containing material as well as size, morphology, and composition of desired structures. For example, the deposition conditions described above can be used to grow nickel silicide nanowires that, on average, are between about 0.5 micrometers and 50 micrometers in length and between about 10 nanometers and 100 nanometers in diameter. A nickel coating that is at least about 20 nanometers thick may be sufficient to deposit such nickel silicide structures.

In general, silicide nanowires may between about 5 nanometers and 100 nanometers in diameter (i.e., prior to depositing active material) or, more specifically, between about 10 nanometers and 50 nanometers. Further, nanowires may be between about 1 micrometer and 100 micrometers long or, more specifically, between about 5 micrometers and 50 micrometers long and even between about 12 micrometers and 30 micrometers. Without being restricted to any particular theory, it is believed that silicide nanowire length may be limited by the diffusion of metal from the substrate to the growing tip. It has been found that nickel silicide nanowires rarely grow longer than about 20 to 25 micrometers when the process conditions described above are used.

While such length may provide an adequate surface area for active material deposition, certain techniques may be used to further elongate nanowires. In certain embodiments, an intermediate sub-layer with a silicon containing material is introduced between the base sub-layer and the metal containing sub-layer. A silicon intermediate sub-layer can provide an alternate (or additional) source of silicon in closer proximity to the root of growing nanostructures, which may aid the nucleation process. It has been found that silicide structures grown from nickel deposited on a silicon wafer nucleates much more uniformly and grows more rapidly. In certain embodiments, an intermediate sub-layer includes a metal dopant that diffuses when silicon reacts with metal and also increases the conductivity of the resulting silicide. The dopant can be deposited or even implanted, particularly if provided in a relatively low quantity. In some cases, nitrogen is used to dope nickel silicide.

In another embodiment, after forming an initial silicide template, an additional metal containing material may be introduced (e.g., sputtered onto the initial template), and silicide formation operation 106 is repeated. In other words, the initial silicide template becomes a new substrate for another silicide template that is deposited over it and so on. In this example, depositing another template may provide additional cross-linking in the initial templates, thereby helping with the mechanical and electrical integrity. Additional examples and details of templates and electrodes are provided in U.S. Provisional Patent Application 61/347,614, entitled "MULTIDIMENSIONAL ELECTROCHEMICALLY ACTIVE STRUCTURES FOR BATTERY ELECTRODE," filed on May 24, 2010, and U.S. Provisional Patent Application 61/406,047, entitled "BATTERY ELECTRODE STRUCTURES FOR HIGH MASS LOADINGS OF HIGH CAPACITY ACTIVE MATERIALS," filed on Oct. 22, 2010, both of which are incorporated herein by reference in their entirety for purposes of describing templates and electrodes.

Silicide nanowires are typically substrate rooted by virtue of growing from a metal containing material provide on the substrate. Certain details of substrate rooted structures are described in U.S. patent application Ser. No. 12/437,529 entitled "ELECTRODE INCLUDING NANOSTRUCTURES FOR RECHARGEABLE CELLS" filed on May 7, 2009, which is incorporated herein by reference in its entirety for purposes of describing substrate rooted structures. However, unlike some VLS grown nanowires described in that patent application, silicide nanowires may form stronger mechanical bonds with the substrate and have lower contact resistance. It is believed that a variable material composition and wider substrate rooted ends contribute to this phenomenon.

It was found that silicide nanowires, when fabricated as described herein, generally have a variable material composition along the length of the nanowire. Nanowires have a higher concentration of metal near the substrate rooted ends, where more metal is available, than near the free (distal) ends. Depending on the metal type, this variability may reflect in different morphological and stoichiometric phases of silicides. For example, a nickel silicide nanowire may include one, two, or all three phases of nickel silicide (i.e., $Ni_2Si$, $NiSi$, and $NiSi_2$). It is believed that higher nickel content phases form stronger bonds with nickel metal. Therefore, this variability may strengthen the nickel silicide nanowires adhesion to the substrate and reduce the contact resistance. Metal content variability may also cause different physical properties along the nanowires' length.

In particular embodiments, substrate rooted ends with the higher nickel content are wider and have higher surface roughness. This provides a greater contact area with the substrate, improves adhesion, and reduces contact resistance. Strong bonds between the substrate and nanowires help to preserve this attachment, particularly during cell cycling when the active material deposited onto nanowires swells and contracts and may push the nanowires in various directions. Finally, in certain embodiments, silicide nanowires do not experience lithiation during cycling.

Cone shaped nanowires, as described above, may result from a greater availability of metal near the substrate rooted ends of the nanowires. In certain embodiments, an average diameter near the substrate rooted ends is at least about twice that of an average diameter near the free end (based on a comparison of the two sections at each end of the nanowire, with each section taken at a distance from the nanowire end that is about 10% of the total nanowire length). In other words, bases may be large enough to even touch each other on the surface of the substrate, but the tips are free and apart as a result of a decrease in diameter along the structure from the base to the tip. In more specific embodiments, a ratio of the two diameters is at least about 4 or, even more specifically, at least about 10 (representing wider base cones).

Silicide nanowires may interconnect with other nanowires, for example, when one nanowire crosses its path with another nanowire during their growth. Further, additional cross-linking may be provided after depositing silicide nanowires. For example, another template may be deposited over the first one, as described above. A conductive additive (e.g., carbon black, metallic particles) may be introduced among the nanowires. Nanowires may be reshaped after deposition to form more contact points among nanowires, for example, by compressing and/or annealing the silicide template. Finally, additional interconnections may occur during deposition of the active material. For example, two closely spaced silicide nanowires may be coated with an active material such that the active material layers formed on the adjacent nanowires overlap. In a specific embodiment, forming a template is performed in a process chamber maintained at a pressure of about 50 Torr. The process gas contains about 1% of silane. The substrate is kept at about 450° C.

It should be noted that while the references in this document are generally made to a template including nanowires, the template may include other types of structures. Further, wire-based templates may include wires that have an average diameter greater than 1 micrometer. Such templates may be used to deposit a layer of high capacity active material such that the layer itself has nano-scale dimensions irrespective of the template dimensions. However, templates made from nanostructures, such as nanowires, generally provide greater surface area available for deposition of the high capacity active material.

After formation of the template but before depositing the active material, the template may be additionally processed to mask certain areas of the template in order to prevent or minimize deposition of the active material in these areas. As described above, mechanical distortions, such as active material swelling and contraction, should be minimized near the substrate interface to preserve mechanical and electrical bonds between the silicide template and substrate. As such, deposition of the active material near the substrate interface is generally not desirable or, at least, less desirable. Some techniques to profile the thickness and/or composition of the active material layer during deposition are described below with reference to active material formation operation 108. Further, additional materials may be deposited at the substrate interface after formation of the template. It should be noted that such materials may be deposited in addition, or instead of, intermediate sub-layers provided prior to formation of the template, which are described above. To distinguish the two materials, the material deposited after formation of the template is referred to as a "passivation material" because it may be used, in certain embodiments, to passivate the substrate interface and reduce formation of the active material at this interface.

Figure 2E:
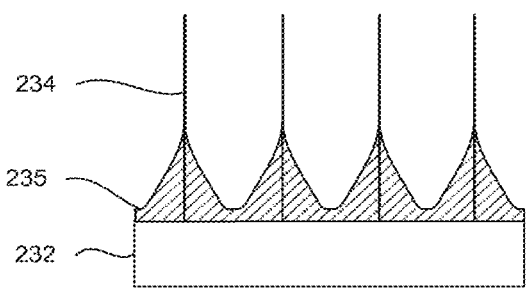
FIGS. 2E and 2F are schematic representations of uncoated silicide structures with a deposited passivation material and coated silicide structures where the passivation material prevented deposition of the active material near the bases of the silicide structures.

FIG. 2E is a schematic representation of uncoated silicide structures 234 with a deposited passivation material 235. The passivation material 235 deposited near the substrate 232 coats the substrate rooted ends of the silicide structures 234 while the free ends of these structures remain uncoated. The passivation material 235 may be deposited during a separate operation or during initial stages of active material deposition. For example, self-assembling zinc oxide and silicon oxide particles may be introduced into the template. The distribution of the passivation material 235 within the template may be provided by electrodeposition.

Figure 2F:
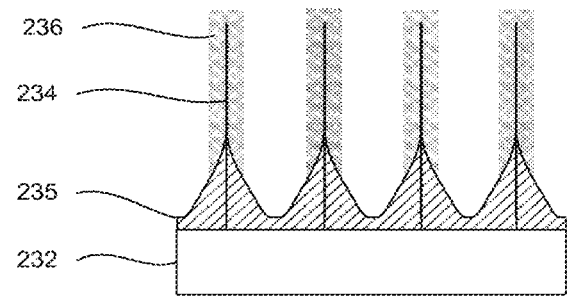

FIG. 2F is a schematic representation of silicide structures 234 coated with an active material 236 such that the passivation material 235 prevented deposition of the active material 236 near the bases of the silicide structures 234. As such, little or no mechanical distortion and stress are present at the substrate 232 during cycling of the electrode, and the connection between the silicide structures 234 and substrate 232 tend to be more robust.

In certain embodiments, an intermediate sub-layer is deposited over a formed template structure but before deposition of the electrochemically active material. This sub-layer is positioned at the template-active material interface. This intermediate sub-layer may include titanium, copper, iron, nickel, nickel titanium, chromium or other similar materials. Materials may be deposited using electroplating, sputtering, or evaporation techniques. Without being restricted to any particular theory, it is believed that a presence of an intermediate sub-layer at this interface increases metallurgical alloying with the active material and better adhesion. Further, some of these materials may act as adhesion promoters and oxygen getters. Finally, alloys like nickel titanium, copper-zinc-aluminum-nickel, and copper-aluminum-nickel may be used for their elastic properties to provide an interface between a relative dynamic active material layer (which swells and contracts during cycling) and relative static template layer.

Returning to FIG. 1, the process 100 continues with formation of a high capacity electrochemically active material over the metal silicide template (operation 108). Examples of electrochemically active materials include silicon containing materials (e.g., crystalline silicon, amorphous silicon, other silicides, silicon oxides, sub-oxides, oxy-nitrides), tin containing materials (e.g., tin, tin oxide), germanium, carbon containing materials, a variety of metal hydrides (e.g., $MgH_2$), silicides, phosphides, and nitrides. Other examples include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). Examples of positive electrochemically active materials include various lithium metal oxides (e.g., $LiCoO_2$, $LiFePO_4$, $LiMnO_2$, $LiNiO_2$, $LiMn_2O_4$, $LiCoPO_4$, $LiNi_{1/3}Co_{1/3}Mn_{1/3}O_2$, $LiNi_xCo_yAl_zO_2$, $LiFe_2(SO_4)_3$, $Li_2FeSiO_4$, $Na_2FeO_4$), carbon fluoride, metal fluorides such as iron fluoride ($FeF_3$), metal oxide, sulfur, and combinations thereof. Doped and non-stoichiometric variations of these positive and negative active materials may be used as well. Examples of dopants include elements from the groups III and V of the periodic table (e.g., boron, aluminum, gallium, indium, thallium, phosphorous, arsenic, antimony, and bismuth) as well as other appropriate dopants (e.g., sulfur and selenium). In certain embodiments, a high capacity active material includes amorphous silicon. For example, a layer of amorphous silicon may be deposited over nickel a silicide template.

High capacity active materials may be doped during or after the deposition operation. Dopants can be used to improve conductivity of the active material and to perform other functions. For example, phosphine ($PH_3$) may be added to the process gas to provide phosphorous doping of silicon or other active materials. In specific embodiments, such as some embodiments employing silane in the process gas, the concentration of phosphine or another dopant carrying component in the process gas may be at least about at least about 0.1% (based on its partial pressure), or at least about 0.5%, or even at least about 1%. Dopants can be also introduced into the active layer after deposition of the active material (e.g., by sputtering, electroplating, ion implantation, and other techniques). In certain embodiments, a lithium containing compound is deposited onto the active material. The additional lithium may be used in a lithium ion cell to offset losses associated with solid electrolyte interface (SEI) layer formation and/or to keep some remaining lithium present in the negative active material even during a complete cell discharge. Retaining some lithium in the negative electrode may help to improve the negative active material conductivity and/or avoid certain morphological changes in the negative active material at the end of the discharge portion of the cycle.

In certain embodiments, multiple different active materials (e.g., high capacity active materials such as tin) may be deposited over the template. In one example, a layer of silicon may be further coated with a carbon layer to form a core-shell structure. In this example, the silicide nanostructure of the template serves as a core, the silicon layer as an intermediate layer or outer core, and the carbon layer as a shell. Other examples include coatings that include materials that are not necessarily electrochemically active materials but that are configured to perform other functions in the electrode, such as promoting the formation of a stable SEI layer. Examples of such materials include carbon, copper, polymers, sulfides, and metal oxides.

In specific embodiments, an active material layer is deposited as a combination of germanium and silicon. The distribution of these two materials varies along the height of the template, such that more germanium is deposited near the substrate interface than near the free ends, and vice versa for silicon. Germanium lithiates much less than silicon and, as a result, germanium exhibits much less swelling. At the same time, a morphological structure of germanium (e.g., its lattice) matches well to that of silicon. Lower swelling, in turn, helps to protect the interface between the substrate and silicide structures, thereby resulting in more robust electrode structures and cells with improved cycling performance.

The CVD process to form a variable composition active material layer may start with introducing a process gas containing an initial concentration of the germanium containing precursor and an initial concentration of the silicon containing precursor. The concentration of the germanium containing precursor is then decreased, while the concentration of the silicon containing precursor is increased.

High capacity active materials may be deposited using CVD techniques, electroplating, electroless plating, or solution deposition. In some embodiments, they are deposited in a manner similar to that employed to grow the silicide structures. Both silicides and active materials may be deposited in the same chamber. More specifically, the same chamber may be also used for the substrate treatment.

In certain embodiments, active materials may be deposited using a plasma enhanced chemical vapor deposition (PECVD) technique. This technique will now be described in more detail with reference to an amorphous silicon layer doped with phosphorous. However, it should be understood that this or similar techniques may be used for other active materials as well. A substrate containing a silicide template, more specifically a nickel silicide template, is provided in a PECVD chamber. The substrate is heated to between about 200° C. and 400° C. or, more specifically, between about 250° C. and 350° C. A process gas containing a silicon containing precursor (e.g., silane) and one or more carrier gases (e.g., argon, nitrogen, helium, hydrogen, oxygen, carbon dioxide, and methane) is introduced into the chamber. In a specific example, a concentration of silane in helium is between about 5% and 20% or, more specifically, between about 8% and 15%. The process gas may also include a dopant containing material, such as phosphine, at a concentration of between about 1% and 5%. The chamber pressure may be maintained at between about 0.1 Torr to 10 Torr or, more specifically, at between about 0.5 Torr and 2 Torr. To enhance silane decomposition, a plasma is ignited in the chamber.

The following process (i.e., Radio Frequency (RF) power and flow rates) parameters are provided for an STS MESC Multiplex CVD system available from Surface Technology Systems in United Kingdom, which can process substrates up to about 4 inches in diameter. It should be understood by one having ordinary skills in the art that these process parameters can be scaled up or down for other types of chambers and substrate sizes. The RF power may be maintained at between about 10W and 100 W and the overall process gas flow rate may be kept at between about 200 sccm and 1000 sccm or, more specifically, at between about 400 sccm and 700 sccm.

In a specific embodiment, forming a layer of the electrochemically active material is performed in a process chamber maintained at a pressure of about 1 Torr. The process gas contains about 50 sccm of silane and about 500 sccm of helium. In order to dope the active material, about 50 sccm of 15% phosphine may be added to the process gas. The substrate is kept at about 300° C. The RF power level is set to about 50 W. In certain embodiments, a pulsed PECVD method is employed.

To achieve an adequate thickness of the active material, deposition may be performed for between about 0.5 minutes and 30 minutes. A thickness of the active material may be driven by energy density requirements, material properties (e.g., theoretical capacity, stress fracture limits), template surface area, and other parameters. In certain embodiments, a layer of amorphous silicon that is between about 50 nanometers and 500 nanometers thick or, more specifically, between about 100 nanometers and 300 nanometers thick, is deposited. It should be noted that this layer is deposited on silicide nanowires having diameters of between about 10 nanometers and 100 nanometers. Therefore, an average diameter of the resulting structure (i.e., silicide nanowires with an active material layer deposited over the nanowires) may be between about 100 nanometers and 1,100 nanometers. Other dimensions may be possible as well. For example, an amorphous silicon layer thicker than about 500 nanometers is possible by increasing porosity of the layer. In certain embodiments, a porous silicon layer may be between about 500 nanometers and 1000 nanometers thick or, more specifically, between about 500 nanometers and 750 nanometers thick. Some examples and details of porous active material structures are provided in U.S. Provisional Patent Application 61/406,049, entitled "COMPOSITE STRUCTURES CONTAINING HIGH CAPACITY POROUS ACTIVE MATERIALS CONSTRAINED IN SHELLS" filed on Oct. 22, 2010, which is incorporated herein by reference in its entirety for purposes of describing porous active material structures.

It has been determined that some active material layers having thicknesses of between about 50 nanometers and 500 nanometers can be typically deposited within 10-20 minutes. Another way to characterize an amount of the deposited active material is relative to the underlying template. In certain embodiments, a mass ratio of the active material volume to the metal silicide volume is at least about 10 or, more specifically, at least about 100. As described in other parts of this document, this ratio may vary significantly along the height of the template. Specifically, this ratio may be substantially less near the substrate interface than near the free ends of the individual structures.

FIG. 3A illustrates four examples of the structures that are produced during different stages of the overall process explained above. A substrate 302 may be initially provided during an initial stage 301. As explained above, a substrate 302 may include a base material and a metal source material (used to form silicide). Various examples and combinations of these materials are described above. The substrate 302 may be then treated to form a surface 304 that is suitable to form silicide nanostructures (stage 303). If the substrate 302 is a foil, surface 304 may be formed on both sides of the foil (not shown). In some examples, surface 304 includes specific nucleation sites for forming nanowires. Surface 304 may also include masking materials. Silicide nanostructures 306 are then formed on the substrate 302 (stage 305). In certain embodiments, silicide nanostructures 306 have their ends rooted to the substrate 302. Silicide nanostructures form a high surface area template that is used for depositing an active material. Finally, an active material layer 308 is deposited over the silicide nanostructures 306 (stage 307). Silicide nanostructures 306 can provide both mechanical support to the active material 308 and electrical connection to the substrate 302. While some contact may exist between the active material and the substrate, it may not be sufficient from a battery performance perspective.

A combination of the silicide nanostructures 306 and the active material 308 may be referred to as an active layer 309, which is adjacent to substrate 302. Overall, active layer 309 may be characterized by its height, which is typically close to the height of the silicide template or the length of the nanowires making this template. In certain embodiments, a height of the active layer is between about 10 micrometers and 50 micrometers or, more specifically, between about 20 micrometers and 40 micrometers. An electrode having a substrate and two active layers deposited on the two opposite sides of the substrate may have a height of between about 50 micrometers and 100 micrometers. Furthermore, active layer 309 may be characterized by its porosity (e.g., at least about 25% or, more specifically, at least about 50% or, even more specifically, at least about 75%), its capacity per unit area, and other characteristics.

Further, an amount of the active material coating the template may vary along the height of the template. For example, an active material layer may be thicker near the free ends of the structures than near the substrate interface. FIG. 3B illustrates an example of such an active material layer 310 deposited over template structures 306 arranged on a substrate 302. Without being restricted to any particular theory, it is believed that such distribution of the active material can be achieved by certain process conditions resulting in a mass transport limiting regime. This regime results in a concentration gradient of the active material precursor species (e.g., silane) along the height of the template and higher deposition rates near the free ends of the structures than near the substrate interface. Such active material distribution may be beneficial from a electrochemical cycling perspective because the substrate rooted ends of the structures will experience less swelling and stress during lithiation, thereby preserving contact between the structures and the substrate.

Specifically, uneven distribution of the active material may be achieved by performing CVD deposition at relative high pressure levels inside the deposition chamber. Without being restricted to any particular theory, it is believed that a shorter mean free path is achieved at higher pressure levels, which, in turn, leads to high faster deposition rates and rapid consumption of the active material precursors near the free ends of the structures. This effectively creates a mass transport limiting regime over the height of the template. For example, deposition may be performed at between about 50 Torr and 760 Torr, more specifically at between about 100 Torr and 600 Torr or, even more specifically, between about 200 Torr and 600 Torr. In a particular example, deposition is performed at about 600 Torr. Deposition temperatures may be between about 400° C. and 600° C. or, more specifically, between about 450° C. and 550° C. In a particular example, deposition is performed at about 500° C. These temperature ranges are presented for a thermal CVD technique. If a PECVD technique is used for deposition, the temperatures may be in the range of between about 200° C. and 450° C. Silane concentration in argon or hydrogen may range between about 0.5% and 20% or, more specifically, between about 0.5% and 10% or, even more specifically, between about 1% and 5%.

Another approach is to perform a deposition using a PECVD technique at a low temperature. PECVD creates localized radicals that have a shorter lifetime than thermally excited radicals. Therefore, the mean free path is believed to be shorter and deposition becomes less conformal, which provides more deposition at the top of the template where the radical concentration is greater. Also, PECVD allows deposition at lower temperatures, as was mentioned above. Lower temperatures help reduce side reactions with the substrate and the forming of an unwanted excess of silicides at the substrate interface that may become brittle. A PECVD deposition may be performed at pressure levels of between about 1 Torr and 50 Torr, temperature ranges of between about 200° C. and 450° C., and a concentration of silane of between about 1% and 20% in hydrogen, helium, nitrogen, argon, or various combinations thereof. Plasma inside the chamber may be biased to provide more desirable distribution of the reactive species.

Furthermore, a remote plasma generator may be used to create activated species from the active material precursors, such as ions and radicals. The activated species (e.g., $^{-2}SiH_2$) are more reactive that their un-activated counterparts (e.g., $SiH_4$) and tend to be consumed faster at the free ends of the structures, thereby effectively creating a mass transport limiting regime. Some examples of the remote plasma generators include ASTRON® i Type AX7670, ASTRON® e Type AX7680, ASTRON® ex Type AX7685, ASTRON® hf-s Type AX7645, which are all available from MKS Instruments of Andover, Mass. The generator is typically a self-contained device generating ionized plasma using the supplied active material precursors. The generator also includes a high power RF generator for supplying energy to the electrons in the plasma. This energy may then be transferred to the neutral active material precursor molecules (e.g., silane) causing the temperature of these molecules to raise to a 2000K level and resulting in thermal dissociation of the molecules. The generator may dissociate more than 90% of the supplied precursor molecules because of its high RF energy and special channel geometry that causes the precursors to adsorb most of this energy. The generator may be used by itself (e.g., together with a Thermal CVD chamber) or in a combination with a PECVD reactor, which may provide further dissociation of the species (e.g., species that were recombined in the deliver line and shower head).

Figure 4A:
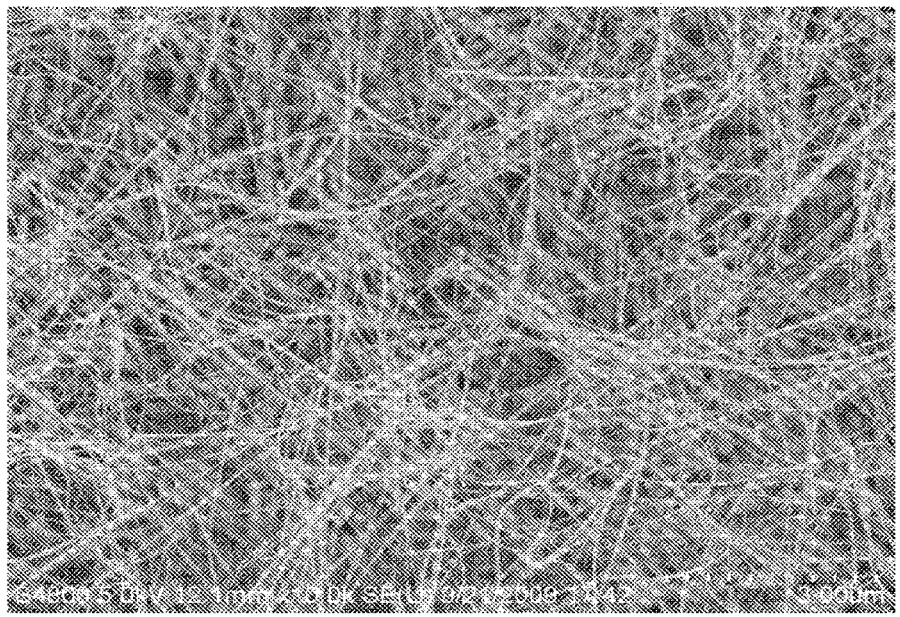
FIG. 4A is a top down scanning electron microscope (SEM) image of the nickel silicide nanowires forming a high surface area template over the nickel coating.

FIG. 4A is an SEM image of the silicide nanowires as viewed from above. These nanowires were deposited directly on a hard rolled nickel foil available from Carl Schlenk AG Company in Roth, Germany. The foil was first oxidized for 1 min at 300° C. in a process chamber containing air at a pressure of 50 Torr. The foil was then heated to 450° C. and a process gas containing 1% by volume of silane was introduced into the chamber for 10 minutes. Resulting silicide nanowires were about 10-50 nanometers in diameter and about 1-30 micrometers in length. A density of nanowires was between about 10-70%. As can be seen in the SEM image, the nanowires form a very high surface area template. These templates were then coated with amorphous silicon and used to construct coin cells.

Figure 4B:
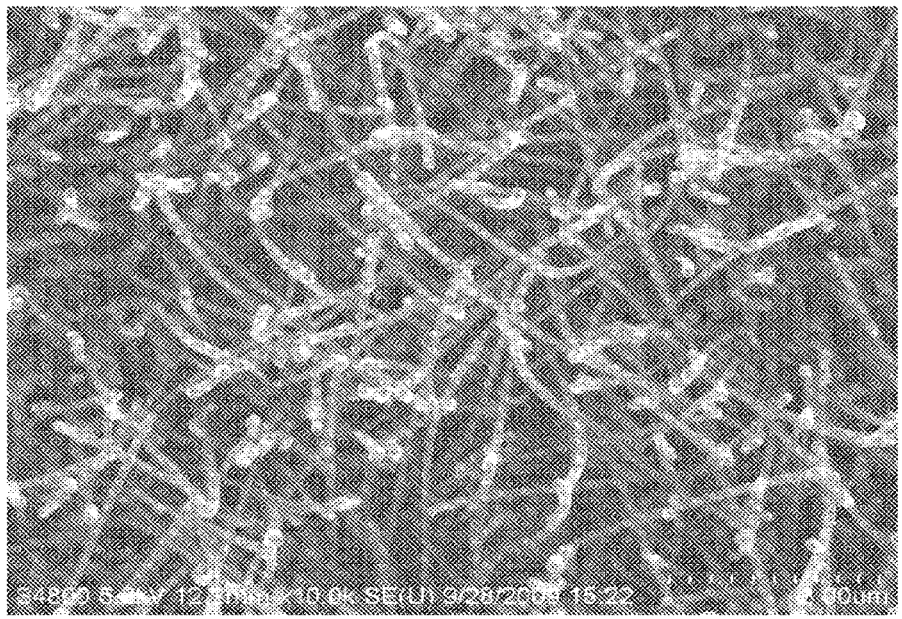
FIG. 4B is a top down SEM image of the amorphous silicon deposited over the nickel silicide nanowires similar to the ones shown in FIG. 4A.

FIG. 4B is an SEM image of the nanowires coated with amorphous silicon. The image was taken from the same direction as was FIG. 4A. The initial silicide template used for depositing the silicon is the same as in FIG. 4A. Amorphous silicon deposition was performed at 300° C. and 1 Torr for 10 minutes. The process gas included 50 sccm of 100% silane, 500 sccm of helium, and 50 sccm of 15% by volume phosphine. The RF power was 50 W. The average diameter of the coated nanowires was estimated to be 271-280 nanometers. The SEM images of both FIGS. 4A and 4B are provided at the same magnification to illustrate the relative sizes of the uncoated template nanowires (in FIG. 4A) and the amorphous silicon structure formed over these nanowires (in FIG. 4B). As can be seen from the two SEM images, the amorphous silicon structures are substantially thicker than the uncoated silicide nanowires.

Figure 4C:
FIG. 4C is a side SEM image of the electrode active layer containing the nickel silicide nanowires coated with the amorphous silicon.

FIG. 4C is a side view SEM image of the active layer containing silicon coated nanowires similar to the ones in FIG. 4A. The nanowires have a relatively high aspect ratio even after being coated with the active material. The height of the active layer is generally defined by length of the nanowires. Further, an active layer has a relatively high porosity, which allows the nanowires to swell during lithiation without generating excessive stresses in the active layer and breaking each other. The porosity also allows electrolyte components to freely migrate through the active layer.

Figure 4D:
FIG. 4D is a high magnification SEM image similar to the one presented in FIG. 4B.

FIG. 4D illustrates a higher magnification SEM image of the active layer originally presented in FIG. 4B. Black arrows point to contact points (sometimes referred to herein as "interconnections") between the nanowires. Such interconnections could have formed during deposition of the nickel silicide nanowires and/or coating the nanowires with amorphous silicon. As indicated above, such interconnections enhance mechanical strength and electrical conductivity of the active layer.

Figure 4E:
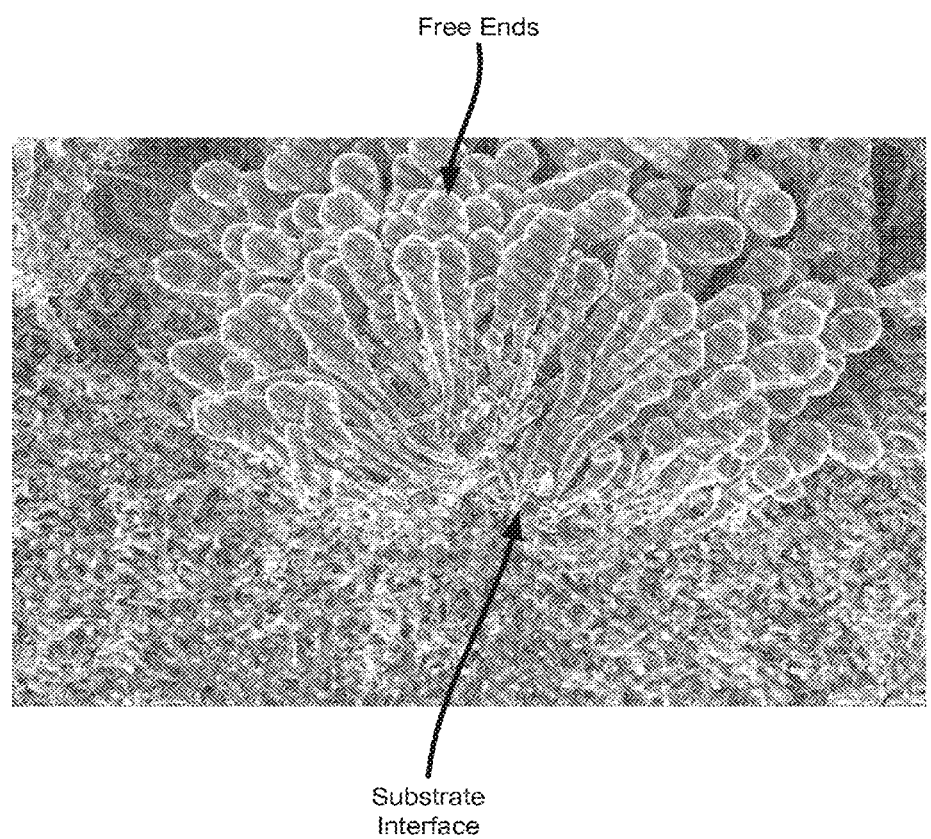
FIG. 4E is an SEM image obtained at an angle with respect to the top surface of the electrode and illustrating nanowires being much thicker at their free ends than at their substrate-rooted ends.

FIG. 4E is an SEM image obtained at an angle with respect to the top surface of the electrode and illustrating nanowires being much thicker at their free ends than at their substrate-rooted ends. The active material structures forming this electrode have much thicker free ends than substrate interface ends. Such structures are schematically illustrated in FIG. 3B and described above. It has been estimated that the structures shown in FIG. 4E have free ends that are about 1 micrometer in diameter, while the substrate rooted ends are about 200 nanometers in diameter. The length of the structures was estimated to be about 12-20 micrometers.

Figure 5A:
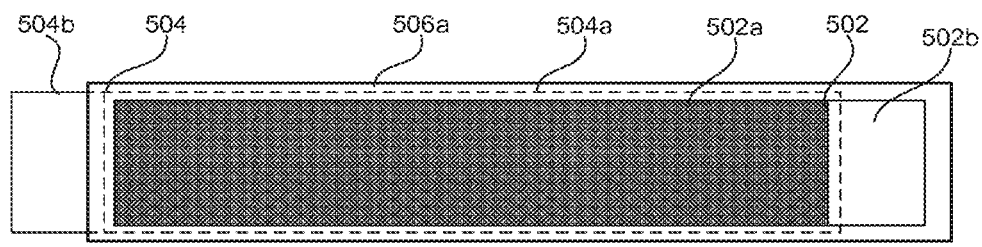
FIGS. 5A-B are a top schematic view and a side schematic view of an illustrative electrode arrangement, in accordance with certain embodiments.
Figure 5B:
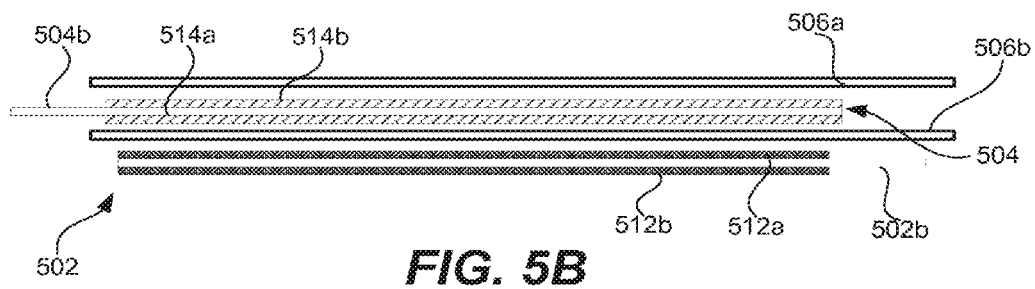

Electrodes are typically assembled into a stack or a jelly roll. FIGS. 5A and 5B illustrates a side and top views of an aligned stack including a positive electrode 502, a negative electrode 504, and two sheets of the separator 506a and 506b, in accordance with certain embodiments. The positive electrode 502 may have a positive active layer 502a and a positive uncoated substrate portion 502b. Similarly, the negative electrode 504 may have a negative active layer 504a and a negative uncoated substrate portion 504b. In many embodiments, the exposed area of the negative active layer 504a is slightly larger that the exposed area of the positive active layer 502a to ensure that most or all lithium ions released from the positive active layer 502a go into the negative active layer 504a. In one embodiment, the negative active layer 504a extends at least between about 0.25 and 5 mm beyond the positive active layer 502a in one or more directions (typically all directions). In a more specific embodiment, the negative layer extends beyond the positive layer by between about 1 and 2 mm in one or more directions. In certain embodiments, the edges of the separator sheets 506a and 506b extend beyond the outer edges of at least the negative active layer 504a to provide electronic insulation of the electrode from the other battery components. The positive uncoated substrate portion 502b may be used for connecting to the positive terminal and may extend beyond negative electrode 504 and/or the separator sheets 506a and 506b. Likewise, the negative uncoated portion 504b may be used for connecting to the negative terminal and may extend beyond positive electrode 502 and/or the separator sheets 506a and 506b.

The positive electrode 502 is shown with two positive active layers 512a and 512b on opposite sides of the flat positive current collector 502b. Similarly, the negative electrode 504 is shown with two negative active layers 514a and 514b on opposite sides of the flat negative current collector. Any gaps between the positive active layer 512a, its corresponding separator sheet 506a, and the corresponding negative active layer 514a are usually minimal to non-existent, especially after the first cycle of the cell. The electrodes and the separators are either tightly wound together in a jelly roll or are positioned in a stack that is then inserted into a tight case. The electrodes and the separator tend to swell inside the case after the electrolyte is introduced, and the first cycles remove any gaps or dry areas as lithium ions cycle the two electrodes and through the separator.

Figure 6A:
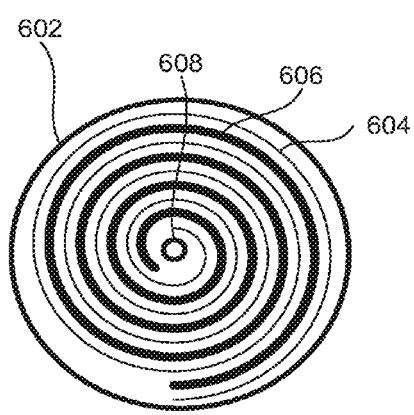
FIGS. 6A-B are a top schematic view and a perspective schematic view of an illustrative round wound cell, in accordance with certain embodiments.
Figure 6B:
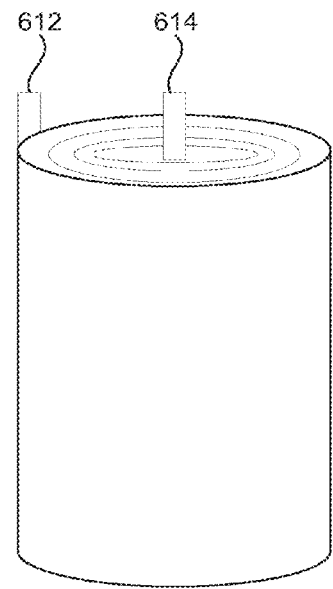

A wound design is a common arrangement. Long and narrow electrodes are wound together with two sheets of separator into a sub-assembly (sometimes referred to as a jellyroll), which is shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and the heights of the active layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells, and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets, which negatively affects the lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 7:
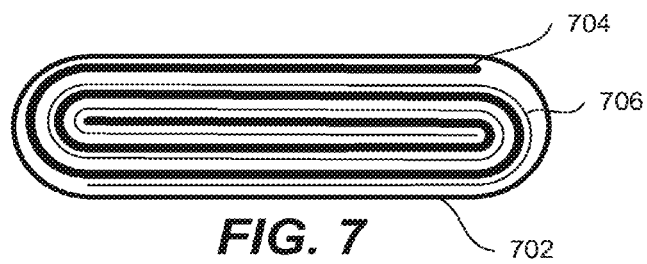
FIG. 7 is a top schematic view of an illustrative prismatic wound cell, in accordance with certain embodiments.

FIG. 7 illustrates a top view of a wound prismatic jellyroll positions in a case 702. The jelly roll comprises a positive electrode 704 and a negative electrode 706. The white space between the electrodes is representative of the separator sheets. The jelly roll is inserted into a rectangular prismatic case. Unlike the cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
FIGS. 8A-B are a top schematic view and a perspective schematic view of an illustrative stack of electrodes and separator sheets, in accordance with certain embodiments.
Figure 8B:
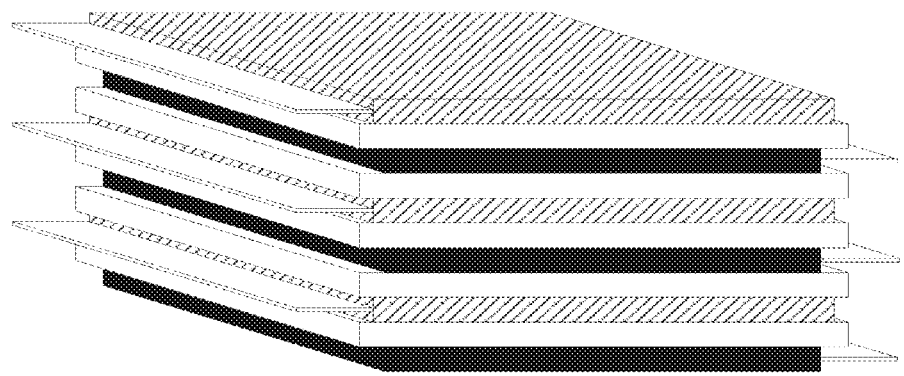

FIG. 8A illustrates a side view of a stacked cell 800 that includes a plurality of sets (801a, 801b, and 801c) of alternating positive and negative electrodes and a separator in between the electrodes. A stacked cell can be made to almost any shape, which is particularly suitable for prismatic cells. However, such a cell typically requires multiple sets of positive and negative electrodes and a more complicated alignment of the electrodes. The current collector tabs typically extend from each electrode and connect to an overall current collector leading to the cell terminal.

Once the electrodes are arranged as described above, the cell is filled with electrolyte. The electrolyte in lithium ions cells may be liquid, solid, or gel. The lithium ion cells with the solid electrolyte are referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a SEI layer. The interphase is generally electrically insulating but ionically conductive, thereby allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=0 group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li)$, and combinations thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment, the total concentration of salt in a liquid nonaqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, it may be no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PNMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
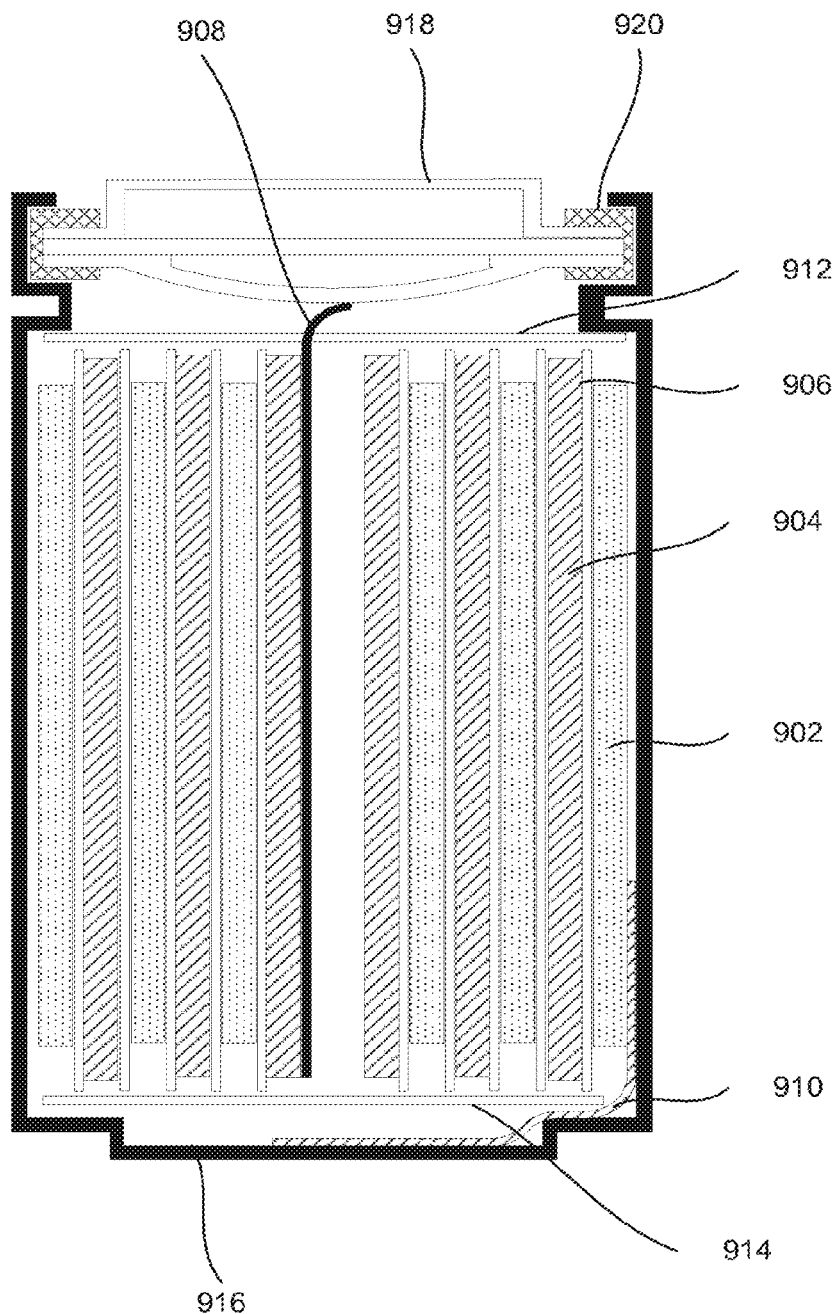
FIG. 9 is a schematic cross-section view of an example of a wound cell, in accordance with embodiments.

FIG. 9 illustrates a cross-section view of a wound cylindrical cell, in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. It should be noted that in certain embodiments a cell is not sealed until after subsequent operations. In some cases, cap 918 or cell case 916 includes a safety device. For example, a safety vent or burst valve may be employed to open if excessive pressure builds up in the battery. In certain embodiments, a one-way gas release valve is included to release oxygen that has been released during activation of the positive material. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may be used for internal insulation. During fabrication, the cap 918 may be crimped to the cell case 916 in order to seal the cell. However, prior to this operation, electrolyte (not shown) is added to fill the porous spaces of the jelly roll.

A rigid case is typically used for lithium ion cells, while lithium polymer cells may be packed into flexible, foil-type (polymer laminate) cases. A variety of materials can be chosen for the cases. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In addition to the battery applications described above, metal silicides may be used in fuel cells (e.g., for anodes, cathodes, and electrolytes), hetero junction solar cell active materials, various forms of current collectors, and/or absorption coatings. Some of these applications can benefit from a high surface area provided by metal silicide structures, high conductivity of silicide materials, and fast inexpensive deposition techniques.

What is claimed is:
1. An electrochemically active electrode material for use in a lithium ion cell, the electrochemically active electrode material comprising:

a nanostructured template comprising a metal silicide, the nanostructured template comprising nanowires rooted to a substrate, the nanowires comprising substrate-rooted ends and free-ends; and non-silicide, electrochemically active material shells coating the nanowires, the non-silicide electrochemically active material having a theoretical lithiation capacity of at least about 500mAh/g, wherein the shells are disjoined at the substrate.

2. The electrochemically active electrode material of claim 1, wherein the shells are at least twice as thick at the free-ends of the nanowires as they are at the substrate-rooted ends.

3. The electrochemically active electrode material of claim 1, wherein the metal silicide is selected from a group consisting of nickel silicide, cobalt silicide, copper silicide, silver silicide, chromium silicide, titanium silicide, aluminum silicide, zinc silicide, and iron silicide.

4. The electrochemically active electrode material of claim 1, wherein the electrochemically active material is selected from the group consisting of crystalline silicon, amorphous silicon, silicon oxides, silicon oxy-nitrides, tin-containing material, and germanium-containing material.

5. The electrochemically active electrode material of claim 1, wherein the shells comprise porous silicon.

6. The electrochemically active electrode material of claim 1, further comprising a dopant in the non-silicide electrochemically active material.

7. An electrochemically active electrode material for use in a lithium ion cell, the electrochemically active electrode material comprising:
a nanostructured template comprising a metal silicide, the nanostructured template comprising nanowires rooted to a substrate, the nanowires comprising substrate-rooted ends and free-ends; and
non-silicide, electrochemically active material shells coating the nanowires, the non-silicide electrochemically active material having a theoretical lithiation capacity of at least about 500mAh/g, wherein the shells are at least twice as thick at the free-ends of the nanowires as they are at the substrate-rooted ends, wherein the thickness of the shells increases continuously from the substrate rooted ends to the free ends of the nanowires.

8. The electrochemically active electrode material of claim 7, wherein the thickness of the shells increases abruptly from the substrate rooted ends to the free ends of the nanowires.

9. The electrochemically active electrode material of claim 7, further comprising a dopant in the non-silicide electrochemically active material.

10. The electrochemically active electrode material of claim 9, wherein the dopant is selected from the group consisting of boron, aluminum, gallium, indium, thallium, phosphorous, arsenic, antimony, bismuth, sulfur, and selenium.

11. The electrochemically active electrode material of claim 7, wherein the thickness of the shells increases gradually from the substrate rooted ends to the free ends of the nanowires.

12. The electrochemically active electrode material of claim 7, wherein the metal silicide is selected from a group consisting of nickel silicide, cobalt silicide, copper silicide, silver silicide, chromium silicide, titanium silicide, aluminum silicide, zinc silicide, and iron silicide.

13. The electrochemically active electrode material of claim 7, wherein the electrochemically active material is selected from the group consisting of crystalline silicon, amorphous silicon, silicon oxides, silicon oxy-nitrides, tin-containing material, and germanium-containing material.

14. The electrochemically active electrode material of claim 7, wherein the shells comprise porous silicon.

15. The electrochemically active electrode material of claim 7, wherein the nanowires are uncoated with electrochemically active material at or near their interfaces with the substrate.

16. The electrochemically active electrode material of claim 7, wherein the nanowires are coated with electrochemically active material at their interfaces with the substrate.

17. An electrochemically active electrode material for use in a lithium ion cell, the electrochemically active electrode material comprising:
a nanostructured template comprising a metal silicide, the nanostructured template comprising nanowires rooted to a substrate, the nanowires comprising substrate-rooted ends and free-ends; and
non-silicide, electrochemically active material shells coating the nanowires, the non-silicide electrochemically active material having a theoretical lithiation capacity of at least about 500 mAh/gu, wherein the shells are at least twice as thick at the free-ends of the nanowires as they are at the substrate-rooted ends, wherein the thickness of the shells increases, not continuously, from the substrate rooted ends to the free ends of the nanowires.

18. The electrochemically active electrode material of claim 17, wherein the thickness of the shells increases abruptly from the substrate rooted ends to the free ends of the nanowires.

19. The electrochemically active electrode material of claim 18, wherein the shells comprise porous silicon.

20. The electrochemically active electrode material of claim 17, wherein the nanowires are uncoated with electrochemically active material at or near their interfaces with the substrate.

21. The electrochemically active electrode material of claim 17, wherein the thickness of the shells increases gradually from the substrate rooted ends to the free ends of the nanowires.

22. The electrochemically active electrode material of claim 17, wherein the nanowires are coated with electrochemically active material at their interfaces with the substrate.

23. The electrochemically active electrode material of claim 17, wherein the metal silicide is selected from a group consisting of nickel silicide, cobalt silicide, copper silicide, silver silicide, chromium silicide, titanium silicide, aluminum silicide, zinc silicide, and iron silicide.

24. The electrochemically active electrode material of claim 17, wherein the electrochemically active material is selected from the group consisting of crystalline silicon, amorphous silicon, silicon oxides, silicon oxy-nitrides, tin-containing material, and germanium-containing material.

25. The electrochemically active electrode material of claim 17, wherein the shells comprise porous silicon.

26. The electrochemically active electrode material of claim 17, further comprising a dopant in the non-silicide electrochemically active material.

27. A lithium ion electrode for use in a lithium ion cell, the lithium ion electrode comprising:
a current collector substrate;
a nanostructured template comprising a metal silicide, the nanostructured template comprising nanowires rooted to the current collector substrate, the nanowires comprising substrate-rooted ends and free-ends; and
non-silicide, electrochemically active material shells coating the nanowires, the non-silicide electrochemically active material having a theoretical lithiation capacity of at least about 500mAh/g, wherein the shells are at least twice as thick at the free-ends of the nanowires as they are at the substrate-rooted ends, wherein the thickness of the shells increases continuously from the substrate rooted ends to the free ends of the nanowires.

28. A lithium ion cell comprising:

a current collector substrate;

a nanostructured template comprising a metal silicide, the nanostructured template comprising nanowires rooted to the current collector substrate, the nanowires comprising substrate-rooted ends and free-ends; and non-silicide, electrochemically active material shells coating the nanowires, the non-silicide electrochemically active material having a theoretical lithiation capacity of at least about 500 mAh/g, wherein the shells are at least twice as thick at the free-ends of the nanowires as they are at the substrate-rooted ends, wherein the thickness of the shells increases continuously from the substrate rooted ends to the free ends of the nanowires.

* * * * *